United States Patent
Teich et al.

(10) Patent No.: US 9,674,458 B2
(45) Date of Patent: Jun. 6, 2017

(54) SMART SURVEILLANCE CAMERA SYSTEMS AND METHODS

(71) Applicant: FLIR Systems, Inc., Wilsonville, OR (US)

(72) Inventors: Andrew C. Teich, West Linn, OR (US); Nicholas Högasten, Santa Barbara, CA (US); Theodore R. Hoelter, Goleta, CA (US); Katrin Strandemar, Rimbo (SE)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 14/246,006

(22) Filed: Apr. 4, 2014

(65) Prior Publication Data
US 2014/0218520 A1 Aug. 7, 2014

Related U.S. Application Data

(63) Continuation of application No. PCT/US2012/058099, filed on Sep. 28, 2012, and a
(Continued)

(51) Int. Cl.
*G06K 9/00* (2006.01)
*H04N 5/235* (2006.01)
(Continued)

(52) U.S. Cl.
CPC ......... *H04N 5/2354* (2013.01); *H04N 5/2257* (2013.01); *H04N 5/2351* (2013.01);
(Continued)

(58) Field of Classification Search
CPC .. G06K 9/00771; H04N 5/2258; H04N 5/225; H04N 5/23209; H04N 5/23212;
(Continued)

(56) References Cited

U.S. PATENT DOCUMENTS

| | | | |
|---|---|---|---|
| 2,764,055 A | 9/1956 | Clemens et al. | |
| 5,307,295 A * | 4/1994 | Taylor | G06F 17/5009 315/292 |

(Continued)

FOREIGN PATENT DOCUMENTS

| | | |
|---|---|---|
| CA | 2764055 | 7/2012 |
| CN | 2874947 | 2/2007 |

(Continued)

OTHER PUBLICATIONS

DARPA, "Broad Agency Announcement Low Cost Thermal Imager Manufacturing (LCTI-M)", Microsystems Technology Office, DARPA-BAA-11-27, Jan. 24, 2011. pp. 1-42, Arlington, VA.

(Continued)

*Primary Examiner* — Eueng-Nan Yeh
(74) *Attorney, Agent, or Firm* — Hynes and Boone, LLP

(57) ABSTRACT

Various techniques are disclosed for smart surveillance camera systems and methods using thermal imaging to intelligently control illumination and monitoring of a surveillance scene. For example, a smart camera system may include a thermal imager, an IR illuminator, a visible light illuminator, a visible/near IR (NIR) light camera, and a processor. The camera system may capture thermal images of the scene using the thermal imager, and analyze the thermal images to detect a presence and an attribute of an object in the scene. In response to the detection, various light sources may be selectively operated to illuminate the object only when needed or desired, with a suitable type of light source, with a suitable beam angle and width, or in otherwise desirable manner. The visible/NIR light camera may also be selectively operated based on the detection to capture or record surveillance images containing objects of interest.

20 Claims, 14 Drawing Sheets

Related U.S. Application Data continuation-in-part of application No. 14/099,818, filed on Dec. 6, 2013, which is a continuation of application No. PCT/US2012/041749, filed on Jun. 8, 2012, application No. 14/246,006, which is a continuation-in-part of application No. 14/101,258, filed on Dec. 9, 2013, which is a continuation of application No. PCT/US2012/041739, filed on Jun. 8, 2012, application No. 14/246,006, which is a continuation-in-part of application No. 13/437,645, filed on Apr. 2, 2012, now Pat. No. 9,171,361, which is a continuation-in-part of application No. 13/105,765, filed on May 11, 2011, now Pat. No. 8,565,547, and a continuation-in-part of application No. 12/766,739, filed on Apr. 23, 2010, now Pat. No. 8,520,970, said application No. 13/105,765 is a continuation of application No. PCT/EP2011/056432, filed on Apr. 21, 2011, and a continuation-in-part of application No. 12/766,739, filed on Apr. 23, 2010, now Pat. No. 8,520,970, said application No. PCT/EP2011/056432 is a continuation-in-part of application No. 12/766,739, filed on Apr. 23, 2010, now Pat. No. 8,520,970, application No. 14/246,006, which is a continuation-in-part of application No. 14/138,058, filed on Dec. 21, 2013, and a continuation-in-part of application No. 12/477,828, filed on Jun. 3, 2009, now Pat. No. 8,749,635, and a continuation-in-part of application No. 14/138,040, filed on Dec. 21, 2013, now Pat. No. 9,451,183, application No. 14/246,006, which is a continuation-in-part of application No. 14/138,052, filed on Dec. 21, 2013.

(60) Provisional application No. 61/545,056, filed on Oct. 7, 2011, provisional application No. 61/663,336, filed on Jun. 22, 2012, provisional application No. 61/495,873, filed on Jun. 10, 2011, provisional application No. 61/495,879, filed on Jun. 10, 2011, provisional application No. 61/495,888, filed on Jun. 10, 2011, provisional application No. 61/473,207, filed on Apr. 8, 2011, provisional application No. 61/748,018, filed on Dec. 31, 2012, provisional application No. 61/792,582, filed on Mar. 15, 2013, provisional application No. 61/746,069, filed on Dec. 26, 2012, provisional application No. 61/793,952, filed on Mar. 15, 2013, provisional application No. 61/746,074, filed on Dec. 26, 2012.

(51) Int. Cl.
*H04N 7/18* (2006.01)
*H04N 5/33* (2006.01)
*H04N 5/225* (2006.01)

(52) U.S. Cl.
CPC .............. *H04N 5/33* (2013.01); *H04N 5/332* (2013.01); *H04N 7/18* (2013.01)

(58) Field of Classification Search
CPC ...... H04N 5/23245; G06T 2207/20221; G06T 2207/10048; G06T 2207/30232; G06T 7/20
See application file for complete search history.

(56) References Cited

U.S. PATENT DOCUMENTS

| | | | |
|---|---|---|---|
| 5,594,447 A * | 1/1997 | Usui et al. | 342/42 |
| 5,877,688 A * | 3/1999 | Morinaka | G01S 7/4813 250/338.1 |
| 6,330,371 B1 | 12/2001 | Chen et al. | |
| 6,348,951 B1 | 2/2002 | Kim | |
| 6,396,543 B1 | 5/2002 | Shin et al. | |
| 6,424,843 B1 | 7/2002 | Reitmaa et al. | |
| 6,442,419 B1 * | 8/2002 | Chu | A61B 5/015 250/316.1 |
| 6,633,231 B1 | 10/2003 | Okamoto et al. | |
| 6,681,120 B1 | 1/2004 | Kim | |
| 6,759,949 B2 | 7/2004 | Miyahara | |
| 6,883,054 B2 | 4/2005 | Yamaguchi et al. | |
| 6,911,652 B2 | 6/2005 | Walkenstein | |
| 7,050,107 B1 | 5/2006 | Frank et al. | |
| D524,785 S | 7/2006 | Huang | |
| 7,084,857 B2 | 8/2006 | Lieberman et al. | |
| 7,208,733 B2 | 4/2007 | Mian et al. | |
| 7,263,379 B1 | 8/2007 | Parkulo et al. | |
| 7,284,921 B2 | 10/2007 | Lapstun et al. | |
| 7,296,747 B2 | 11/2007 | Rohs | |
| 7,305,368 B2 | 12/2007 | Lieberman et al. | |
| 7,321,783 B2 | 1/2008 | Kim | |
| 7,333,832 B2 | 2/2008 | Tsai et al. | |
| 7,377,835 B2 | 5/2008 | Parkulo et al. | |
| 7,420,663 B2 | 9/2008 | Wang et al. | |
| 7,453,064 B2 | 11/2008 | Lee | |
| 7,477,309 B2 | 1/2009 | Cuccias | |
| 7,567,818 B2 | 7/2009 | Pylkko | |
| 7,572,077 B2 | 8/2009 | Lapstun et al. | |
| 7,575,077 B2 | 8/2009 | Priepke et al. | |
| 7,595,904 B2 | 9/2009 | Lapstun et al. | |
| 7,627,364 B2 | 12/2009 | Sato | |
| 7,697,962 B2 | 4/2010 | Cradick et al. | |
| 7,723,686 B2 | 5/2010 | Hannebauer | |
| 7,725,141 B2 | 5/2010 | Su | |
| 7,728,281 B2 | 6/2010 | Chen | |
| 7,735,974 B2 | 6/2010 | Silverbrook et al. | |
| 7,747,454 B2 | 6/2010 | Bartfeld et al. | |
| 7,760,919 B2 | 7/2010 | Namgoong | |
| 7,761,114 B2 | 7/2010 | Silverbrook et al. | |
| 7,773,870 B2 | 8/2010 | Naruse | |
| 7,801,733 B2 | 9/2010 | Lee et al. | |
| 7,810,733 B2 | 10/2010 | Silverbrook et al. | |
| 7,872,574 B2 | 1/2011 | Betts et al. | |
| 7,900,842 B2 | 3/2011 | Silverbrook et al. | |
| 7,903,152 B2 | 3/2011 | Kim | |
| 7,947,222 B2 | 5/2011 | Bae et al. | |
| 7,960,700 B2 | 6/2011 | Craig et al. | |
| 8,275,413 B1 | 9/2012 | Fraden et al. | |
| 8,305,577 B2 | 11/2012 | Kivioja et al. | |
| 8,345,226 B2 | 1/2013 | Zhang | |
| 8,537,343 B2 | 9/2013 | Zhang | |
| 8,781,420 B2 | 7/2014 | Schlub et al. | |
| 8,825,112 B1 | 9/2014 | Fraden et al. | |
| 2002/0006337 A1 | 1/2002 | Kimura et al. | |
| 2002/0122036 A1 | 9/2002 | Sasaki | |
| 2002/0135571 A1 | 9/2002 | Klocek et al. | |
| 2002/0140542 A1 | 10/2002 | Prokoski et al. | |
| 2002/0149600 A1 | 10/2002 | Van Splunter et al. | |
| 2003/0007193 A1 | 1/2003 | Sato et al. | |
| 2003/0112871 A1 | 6/2003 | Demos | |
| 2003/0122957 A1 | 7/2003 | Emme | |
| 2003/0222935 A1 * | 12/2003 | Yabuta | B41J 11/009 347/19 |
| 2003/0223623 A1 | 12/2003 | Gutta et al. | |
| 2004/0047518 A1 | 3/2004 | Tiana | |
| 2004/0101298 A1 | 5/2004 | Mandelbaum et al. | |
| 2004/0105573 A1 * | 6/2004 | Neumann | G06T 17/00 382/103 |
| 2004/0113933 A1 * | 6/2004 | Guler | 345/716 |
| 2004/0127156 A1 | 7/2004 | Park | |
| 2004/0128070 A1 | 7/2004 | Schmidt et al. | |
| 2004/0157612 A1 | 8/2004 | Kim | |
| 2004/0165788 A1 | 8/2004 | Perez et al. | |
| 2004/0169860 A1 | 9/2004 | Jung et al. | |
| 2004/0207036 A1 | 10/2004 | Ikeda | |
| 2004/0256561 A1 | 12/2004 | Beuhler et al. | |
| 2005/0030314 A1 | 2/2005 | Dawson | |

(56) References Cited

U.S. PATENT DOCUMENTS

| | | |
|---|---|---|
| 2005/0067852 A1 | 3/2005 | Jeong |
| 2005/0068333 A1 | 3/2005 | Nakahashi et al. |
| 2005/0089241 A1 | 4/2005 | Kawanishi et al. |
| 2005/0093890 A1 | 5/2005 | Baudisch |
| 2005/0110803 A1 | 5/2005 | Sugimura |
| 2005/0138569 A1 | 6/2005 | Baxter et al. |
| 2005/0169655 A1 | 8/2005 | Koyama et al. |
| 2005/0184993 A1 | 8/2005 | Ludwin et al. |
| 2005/0213813 A1 | 9/2005 | Lin et al. |
| 2005/0213853 A1 | 9/2005 | Maier et al. |
| 2005/0219249 A1 | 10/2005 | Xie et al. |
| 2005/0248912 A1 | 11/2005 | Kang et al. |
| 2005/0265688 A1 | 12/2005 | Kobayashi |
| 2005/0270784 A1 | 12/2005 | Hahn et al. |
| 2005/0277447 A1 | 12/2005 | Buil et al. |
| 2006/0039686 A1 | 2/2006 | Soh et al. |
| 2006/0060984 A1 | 3/2006 | Wakabayashi et al. |
| 2006/0077246 A1 | 4/2006 | Kawakami et al. |
| 2006/0097172 A1 | 5/2006 | Park |
| 2006/0120712 A1 | 6/2006 | Kim |
| 2006/0132642 A1 | 6/2006 | Hosaka et al. |
| 2006/0140501 A1 | 6/2006 | Tadas |
| 2006/0147191 A1 | 7/2006 | Kim |
| 2006/0154559 A1 | 7/2006 | Yoshida |
| 2006/0210249 A1 | 9/2006 | Seto |
| 2006/0234744 A1 | 10/2006 | Sung et al. |
| 2006/0240867 A1 | 10/2006 | Wang et al. |
| 2006/0279758 A1 | 12/2006 | Myoki |
| 2006/0285907 A1 | 12/2006 | Kang et al. |
| 2007/0004449 A1 | 1/2007 | Sham |
| 2007/0019077 A1 | 1/2007 | Park |
| 2007/0019099 A1 | 1/2007 | Lieberman et al. |
| 2007/0019103 A1 | 1/2007 | Lieberman et al. |
| 2007/0033309 A1 | 2/2007 | Kuwabara et al. |
| 2007/0034800 A1 | 2/2007 | Huang |
| 2007/0052616 A1 | 3/2007 | Yoon |
| 2007/0057764 A1 | 3/2007 | Sato et al. |
| 2007/0103479 A1 | 5/2007 | Kim et al. |
| 2007/0120879 A1 | 5/2007 | Kanade et al. |
| 2007/0132858 A1 | 6/2007 | Chiba et al. |
| 2007/0139739 A1 | 6/2007 | Kim et al. |
| 2007/0159524 A1 | 7/2007 | Kim et al. |
| 2007/0189583 A1 | 8/2007 | Shimada et al. |
| 2007/0211965 A1 | 9/2007 | Helbing et al. |
| 2007/0222798 A1 | 9/2007 | Kuno |
| 2007/0248284 A1 | 10/2007 | Bernsen et al. |
| 2007/0274541 A1 | 11/2007 | Uetake et al. |
| 2007/0285439 A1 | 12/2007 | King et al. |
| 2007/0286517 A1 | 12/2007 | Paik et al. |
| 2007/0299226 A1 | 12/2007 | Park et al. |
| 2008/0038579 A1 | 2/2008 | Schuisky et al. |
| 2008/0056612 A1 | 3/2008 | Park et al. |
| 2008/0079834 A1 | 4/2008 | Chung et al. |
| 2008/0112012 A1 | 5/2008 | Yokoyama et al. |
| 2008/0151056 A1 | 6/2008 | Ahamefula |
| 2008/0165190 A1 | 7/2008 | Min et al. |
| 2008/0165342 A1 | 7/2008 | Yoshida et al. |
| 2008/0170082 A1 | 7/2008 | Kim |
| 2008/0174678 A1* | 7/2008 | Solomon ............. 348/231.99 |
| 2008/0218474 A1 | 9/2008 | Ahn et al. |
| 2008/0248833 A1 | 10/2008 | Silverbrook et al. |
| 2008/0266079 A1 | 10/2008 | Lontka |
| 2008/0278772 A1 | 11/2008 | Silverbrook et al. |
| 2008/0284880 A1 | 11/2008 | Numata |
| 2008/0292144 A1 | 11/2008 | Kim |
| 2008/0297614 A1 | 12/2008 | Lieberman et al. |
| 2009/0023421 A1 | 1/2009 | Parkulo et al. |
| 2009/0027525 A1 | 1/2009 | Lin et al. |
| 2009/0040042 A1 | 2/2009 | Lontka |
| 2009/0040195 A1 | 2/2009 | Njolstad et al. |
| 2009/0052883 A1 | 2/2009 | Lee et al. |
| 2009/0129700 A1 | 5/2009 | Rother et al. |
| 2009/0131104 A1 | 5/2009 | Yoon |
| 2009/0148019 A1 | 6/2009 | Hamada et al. |
| 2009/0213110 A1 | 8/2009 | Kato et al. |
| 2009/0215479 A1 | 8/2009 | Karmarkar |
| 2009/0227287 A1 | 9/2009 | Kotidis |
| 2009/0238238 A1 | 9/2009 | Hollander et al. |
| 2009/0278048 A1 | 11/2009 | Choe et al. |
| 2009/0297062 A1 | 12/2009 | Molne et al. |
| 2010/0039511 A1* | 2/2010 | Wang ............................ 348/143 |
| 2010/0066866 A1 | 3/2010 | Lim |
| 2010/0090965 A1 | 4/2010 | Birkler |
| 2010/0090983 A1 | 4/2010 | Challener et al. |
| 2010/0103141 A1 | 4/2010 | Challener et al. |
| 2010/0113068 A1 | 5/2010 | Rothschild |
| 2010/0131268 A1 | 5/2010 | Moeller |
| 2010/0144387 A1 | 6/2010 | Chou |
| 2010/0163730 A1 | 7/2010 | Schmidt et al. |
| 2010/0179785 A1* | 7/2010 | Jensen ........................ 702/135 |
| 2010/0234067 A1 | 9/2010 | Silverbrook et al. |
| 2010/0245582 A1 | 9/2010 | Harel |
| 2010/0245585 A1 | 9/2010 | Fisher et al. |
| 2010/0245826 A1 | 9/2010 | Lee |
| 2010/0314543 A1 | 12/2010 | Lee et al. |
| 2011/0043486 A1 | 2/2011 | Hagiwara et al. |
| 2011/0063446 A1 | 3/2011 | McMordie et al. |
| 2011/0102599 A1 | 5/2011 | Kwon et al. |
| 2011/0117532 A1 | 5/2011 | Relyea et al. |
| 2011/0121978 A1 | 5/2011 | Schwörer et al. |
| 2011/0122075 A1 | 5/2011 | Seo et al. |
| 2011/0128384 A1 | 6/2011 | Tiscareno et al. |
| 2011/0205367 A1 | 8/2011 | Brown et al. |
| 2012/0007987 A1 | 1/2012 | Gaber |
| 2012/0083314 A1 | 4/2012 | Ng et al. |
| 2012/0169866 A1* | 7/2012 | Schmidt et al. ............. 348/135 |
| 2012/0184252 A1 | 7/2012 | Hirsch |
| 2012/0273688 A1 | 11/2012 | Tsai et al. |
| 2012/0274814 A1 | 11/2012 | Wajs |
| 2012/0276954 A1 | 11/2012 | Kowalsky |
| 2012/0292518 A1 | 11/2012 | Goldstein |
| 2012/0320086 A1 | 12/2012 | Kasama et al. |
| 2013/0204570 A1 | 8/2013 | Mendelson et al. |
| 2013/0320220 A1 | 12/2013 | Donowsky |

FOREIGN PATENT DOCUMENTS

| | | |
|---|---|---|
| CN | 2899321 | 5/2007 |
| CN | 100466678 C | 3/2009 |
| CN | 201203922 | 3/2009 |
| CN | 101635754 | 1/2010 |
| CN | 201481406 | 5/2010 |
| CN | 201550169 | 8/2010 |
| CN | 101859209 | 10/2010 |
| CN | 201628839 | 11/2010 |
| CN | 101945154 | 1/2011 |
| CN | 102045423 | 5/2011 |
| CN | 102045448 | 5/2011 |
| CN | 102055836 | 5/2011 |
| CN | 201869255 | 6/2011 |
| CN | 201897853 | 7/2011 |
| CN | 102178510 | 9/2011 |
| CN | 202261481 | 5/2012 |
| CN | 102880289 | 1/2013 |
| CN | 202998279 | 6/2013 |
| DE | 102006057431 | 6/2008 |
| EP | 1725010 | 11/2006 |
| EP | 2477391 | 7/2012 |
| JP | 1997275518 | 4/1999 |
| JP | 2004048571 | 2/2004 |
| JP | 2006098098 | 4/2006 |
| JP | 2006105655 | 4/2006 |
| JP | 2007006475 | 1/2007 |
| JP | 2007325842 | 12/2007 |
| JP | 2010181324 | 8/2010 |
| JP | 2012231309 | 11/2012 |
| KR | 20000026757 | 5/2000 |
| KR | 100227582 | 11/2000 |
| KR | 100272582 | 11/2000 |
| KR | 20000073381 | 12/2000 |
| KR | 100285817 | 1/2001 |
| KR | 20010001341 | 1/2001 |
| KR | 20010002462 | 1/2001 |
| KR | 20010010010 | 2/2001 |

(56) References Cited

FOREIGN PATENT DOCUMENTS

| | | |
|---|---|---|
| KR | 20010014992 | 2/2001 |
| KR | 20010044756 | 6/2001 |
| KR | 20010050263 | 6/2001 |
| KR | 20010060752 | 7/2001 |
| KR | 20010068202 | 7/2001 |
| KR | 20010070355 | 7/2001 |
| KR | 20010074565 | 8/2001 |
| KR | 20020006967 | 1/2002 |
| KR | 20020044339 | 6/2002 |
| KR | 20020049605 | 6/2002 |
| KR | 20060071220 | 6/2002 |
| KR | 20020061406 | 7/2002 |
| KR | 20020061920 | 7/2002 |
| KR | 20020069690 | 9/2002 |
| KR | 20020078469 | 10/2002 |
| KR | 20020083368 | 11/2002 |
| KR | 20020083961 | 11/2002 |
| KR | 20020085124 | 11/2002 |
| KR | 20020085490 | 11/2002 |
| KR | 20020095752 | 12/2002 |
| KR | 20030000332 | 1/2003 |
| KR | 20030007030 | 1/2003 |
| KR | 20030012444 | 2/2003 |
| KR | 20030016607 | 3/2003 |
| KR | 20030024545 | 3/2003 |
| KR | 20030037101 | 5/2003 |
| KR | 20030051140 | 6/2003 |
| KR | 20030055693 | 7/2003 |
| KR | 20030056667 | 7/2003 |
| KR | 20030067116 | 8/2003 |
| KR | 20030085742 | 11/2003 |
| KR | 20030088968 | 11/2003 |
| KR | 20040001684 | 1/2004 |
| KR | 20040001686 | 1/2004 |
| KR | 20040023826 | 3/2004 |
| KR | 20040027692 | 4/2004 |
| KR | 20040033223 | 4/2004 |
| KR | 20040033532 | 4/2004 |
| KR | 20040033986 | 4/2004 |
| KR | 20040033993 | 4/2004 |
| KR | 20040039868 | 5/2004 |
| KR | 20040040296 | 5/2004 |
| KR | 20040042475 | 5/2004 |
| KR | 20040044624 | 5/2004 |
| KR | 100437890 | 6/2004 |
| KR | 20040054416 | 6/2004 |
| KR | 20040058969 | 7/2004 |
| KR | 20040062802 | 7/2004 |
| KR | 20040064855 | 7/2004 |
| KR | 20040066724 | 7/2004 |
| KR | 20040068864 | 8/2004 |
| KR | 20040070840 | 8/2004 |
| KR | 20040076308 | 9/2004 |
| KR | 20040086994 | 10/2004 |
| KR | 20040102386 | 12/2004 |
| KR | 20050008245 | 1/2005 |
| KR | 20050011313 | 1/2005 |
| KR | 20050012505 | 2/2005 |
| KR | 20050014448 | 2/2005 |
| KR | 20050015293 | 2/2005 |
| KR | 20050015526 | 2/2005 |
| KR | 20050015745 | 2/2005 |
| KR | 20050018370 | 2/2005 |
| KR | 20050023950 | 3/2005 |
| KR | 20050028537 | 3/2005 |
| KR | 20050033308 | 4/2005 |
| KR | 101006660 | 9/2005 |
| KR | 1020050095463 | 9/2005 |
| KR | 100547739 | 1/2006 |
| KR | 20060023957 | 3/2006 |
| KR | 1020060019715 | 3/2006 |
| KR | 100645746 | 5/2006 |
| KR | 20060054877 | 5/2006 |
| KR | 100612890 | 8/2006 |
| KR | 100633792 | 10/2006 |
| KR | 100646966 | 11/2006 |
| KR | 20060119077 | 11/2006 |
| KR | 20060119236 | 11/2006 |
| KR | 20060120318 | 11/2006 |
| KR | 20060121595 | 11/2006 |
| KR | 100660125 | 12/2006 |
| KR | 100663528 | 1/2007 |
| KR | 100672377 | 1/2007 |
| KR | 20070002590 | 1/2007 |
| KR | 20070005263 | 1/2007 |
| KR | 20070005553 | 1/2007 |
| KR | 20070009380 | 1/2007 |
| KR | 100677913 | 2/2007 |
| KR | 100689465 | 3/2007 |
| KR | 20070028201 | 3/2007 |
| KR | 100722974 | 5/2007 |
| KR | 100729813 | 6/2007 |
| KR | 20070067650 | 6/2007 |
| KR | 100743171 | 7/2007 |
| KR | 100743254 | 7/2007 |
| KR | 20070068501 | 7/2007 |
| KR | 20070078477 | 8/2007 |
| KR | 20070082960 | 8/2007 |
| KR | 20070087513 | 8/2007 |
| KR | 20070091486 | 9/2007 |
| KR | 100766953 | 10/2007 |
| KR | 100771364 | 10/2007 |
| KR | 20070104957 | 10/2007 |
| KR | 100777428 | 11/2007 |
| KR | 20070115754 | 12/2007 |
| KR | 20070122344 | 12/2007 |
| KR | 20070122345 | 12/2007 |
| KR | 100802525 | 2/2008 |
| KR | 20080013314 | 2/2008 |
| KR | 20080015099 | 2/2008 |
| KR | 20080015100 | 2/2008 |
| KR | 20080015973 | 2/2008 |
| KR | 20080018407 | 2/2008 |
| KR | 100822053 | 4/2008 |
| KR | 20080045551 | 5/2008 |
| KR | 100841243 | 6/2008 |
| KR | 20080053057 | 6/2008 |
| KR | 20080054596 | 6/2008 |
| KR | 100846192 | 7/2008 |
| KR | 20080059882 | 7/2008 |
| KR | 20080069007 | 7/2008 |
| KR | 100854932 | 8/2008 |
| KR | 20080071070 | 8/2008 |
| KR | 20080078315 | 8/2008 |
| KR | 100866177 | 10/2008 |
| KR | 100866475 | 11/2008 |
| KR | 100866476 | 11/2008 |
| KR | 100866573 | 11/2008 |
| KR | 100870724 | 11/2008 |
| KR | 20080096918 | 11/2008 |
| KR | 20080098409 | 11/2008 |
| KR | 100871916 | 12/2008 |
| KR | 20080112331 | 12/2008 |
| KR | 20090003899 | 1/2009 |
| KR | 20090018486 | 2/2009 |
| KR | 20090020864 | 2/2009 |
| KR | 100888554 | 3/2009 |
| KR | 20090036734 | 4/2009 |
| KR | 100897170 | 5/2009 |
| KR | 20090052526 | 5/2009 |
| KR | 100901784 | 6/2009 |
| KR | 100903348 | 6/2009 |
| KR | 20090089931 | 8/2009 |
| KR | 100922497 | 10/2009 |
| KR | 20090105424 | 10/2009 |
| KR | 100932752 | 12/2009 |
| KR | 100935495 | 1/2010 |
| KR | 20100006652 | 1/2010 |
| KR | 2010022327 | 3/2010 |
| KR | 20100039170 | 4/2010 |
| KR | 100958030 | 5/2010 |
| KR | 20100059681 | 6/2010 |
| KR | 20100070116 | 6/2010 |
| KR | 20100070119 | 6/2010 |

(56) References Cited

FOREIGN PATENT DOCUMENTS

| | | |
|---|---|---|
| KR | 20100072994 | 7/2010 |
| KR | 100977516 | 8/2010 |
| KR | 2010091758 | 8/2010 |
| KR | 20100089125 | 8/2010 |
| KR | 20100090521 | 8/2010 |
| KR | 20100091758 | 8/2010 |
| KR | 20100098958 | 9/2010 |
| KR | 100985816 | 10/2010 |
| KR | 100990904 | 11/2010 |
| KR | 20100123021 | 11/2010 |
| KR | 1006660 | 1/2011 |
| KR | 20110006437 | 1/2011 |
| KR | 20110011264 | 2/2011 |
| KR | 2011019994 | 3/2011 |
| KR | 2011024290 | 3/2011 |
| KR | 101111167 | 4/2011 |
| KR | 1111167 | 2/2012 |
| KR | 1020130142810 | 12/2013 |
| TW | 201116030 | 5/2011 |
| WO | WO 03/093963 | 11/2003 |
| WO | WO 2005/002228 | 1/2005 |
| WO | WO 2005/088846 | 9/2005 |
| WO | WO 2006/112866 | 10/2006 |
| WO | WO 2007/006242 | 1/2007 |
| WO | WO 2009/122114 | 10/2009 |
| WO | WO 2010/005152 | 1/2010 |
| WO | WO 2010/033142 | 3/2010 |
| WO | WO 2010/121354 | 10/2010 |

OTHER PUBLICATIONS

Reddy et al., "Reference Free Nonuniformity Correction for Mercury Cadmium Telluride Infrared Focal Plane Arrays," Communications and Signal Processing, 1998.COMSIG'98. Proceedings of the 1998 South African Symposium, Sep. 8, 1998, pp. 243-248.

\* cited by examiner

SMART SURVEILLANCE CAMERA SYSTEMS AND METHODS

CROSS-REFERENCE TO RELATED APPLICATIONS

This application is a continuation of U.S. International Patent Application No. PCT/US2012/058099 filed Sep. 28, 2012 and entitled "SMART SURVEILLANCE CAMERA SYSTEMS AND METHODS" which is hereby incorporated by reference in its entirety.

U.S. International Patent Application No. PCT/US2012/058099 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

U.S. International Patent Application No. PCT/US2012/058099 claims the benefit of U.S. Provisional Patent Application No. 61/663,336 filed Jun. 22, 2012 and entitled "SMART SURVEILLANCE CAMERA SYSTEMS AND METHODS" which is hereby incorporated by reference in its entirety.

This application is a continuation-in-part of U.S. patent application Ser. No. 14/099,818 filed Dec. 6, 2013 and entitled "NON-UNIFORMITY CORRECTION TECHNIQUES FOR INFRARED IMAGING DEVICES" which is hereby incorporated by reference in its entirety.

U.S. patent application Ser. No. 14/099,818 is a continuation of International Patent Application No. PCT/US2012/041749 filed Jun. 8, 2012 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041749 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041749 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

This application is a continuation-in-part of U.S. patent application Ser. No. 14/101,258 filed Dec. 9, 2013 and entitled "INFRARED CAMERA SYSTEM ARCHITECTURES" which is hereby incorporated by reference in its entirety.

U.S. patent application Ser. No. 14/101,258 is a continuation of International Patent Application No. PCT/US2012/041739 filed Jun. 8, 2012 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041739 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

This patent application is a continuation-in-part of U.S. patent application Ser. No. 13/437,645 filed Apr. 2, 2012 and entitled "INFRARED RESOLUTION AND CONTRAST ENHANCEMENT WITH FUSION" which is hereby incorporated by reference in its entirety.

U.S. patent application Ser. No. 13/437,645 is a continuation-in-part of U.S. patent application Ser. No. 13/105,765 filed May 11, 2011 and entitled "INFRARED RESOLUTION AND CONTRAST ENHANCEMENT WITH FUSION" which is hereby incorporated by reference in its entirety.

U.S. patent application Ser. No. 13/437,645 also claims the benefit of U.S. Provisional Patent Application No. 61/473,207 filed Apr. 8, 2011 and entitled "INFRARED RESOLUTION AND CONTRAST ENHANCEMENT WITH FUSION" which is hereby incorporated by reference in its entirety.

U.S. patent application Ser. No. 13/437,645 is also a continuation-in-part of U.S. patent application Ser. No. 12/766,739 filed Apr. 23, 2010 and entitled "INFRARED RESOLUTION AND CONTRAST ENHANCEMENT WITH FUSION" which is hereby incorporated by reference in its entirety.

U.S. patent application Ser. No. 13/105,765 is a continuation of International Patent Application No. PCT/EP2011/056,432 filed Apr. 21, 2011 and entitled "INFRARED RESOLUTION AND CONTRAST ENHANCEMENT WITH FUSION" which is hereby incorporated by reference in its entirety.

U.S. patent application Ser. No. 13/105,765 is also a continuation-in-part of U.S. patent application Ser. No. 12/766,739 which is hereby incorporated by reference in its entirety.

International Patent Application No. PCT/EP2011/056432 is a continuation-in-part of U.S. patent application Ser. No. 12/766,739 which is hereby incorporated by reference in its entirety.

International Patent Application No. PCT/EP2011/056432 also claims the benefit of U.S. Provisional Patent Application No. 61/473,207 which is hereby incorporated by reference in its entirety.

This application is a continuation-in-part of U.S. patent application Ser. No. 14/138,058 filed Dec. 21, 2013 and entitled "COMPACT MULTI-SPECTRUM IMAGING WITH FUSION" which is hereby incorporated by reference in its entirety.

U.S. patent application Ser. No. 14/138,058 claims the benefit of U.S. Provisional Patent Application No. 61/748,018 filed Dec. 31, 2012 and entitled "COMPACT MULTI-SPECTRUM IMAGING WITH FUSION" which is hereby incorporated by reference in its entirety.

This application is a continuation-in-part of U.S. patent application Ser. No. 12/477,828 filed Jun. 3, 2009 and entitled "INFRARED CAMERA SYSTEMS AND METHODS FOR DUAL to SENSOR APPLICATIONS" which is hereby incorporated by reference in its entirety.

This application is a continuation-in-part of U.S. patent application Ser. No. 14/138,040 filed Dec. 21, 2013 and entitled "TIME SPACED INFRARED IMAGE ENHANCEMENT" which is hereby incorporated by reference in its entirety.

U.S. patent application Ser. No. 14/138,040 claims the benefit of U.S. Provisional Patent Application No. 61/792,582 filed Mar. 15, 2013 and entitled "TIME SPACED INFRARED IMAGE ENHANCEMENT" which is hereby incorporated by reference in its entirety.

U.S. patent application Ser. No. 14/138,040 also claims the benefit of U.S. Provisional Patent Application No. 61/746,069 filed Dec. 26, 2012 and entitled "TIME SPACED INFRARED IMAGE ENHANCEMENT" which is hereby incorporated by reference in its entirety.

This application is a continuation-in-part of U.S. patent application Ser. No. 14/138,052 filed Dec. 21, 2013 and entitled "INFRARED IMAGING ENHANCEMENT WITH FUSION" which is hereby incorporated by reference in its entirety.

U.S. patent application Ser. No. 14/138,052 claims the benefit of U.S. Provisional Patent Application No. 61/793,952 filed Mar. 15, 2013 and entitled "INFRARED IMAGING ENHANCEMENT WITH FUSION" which is hereby incorporated by reference in its entirety.

U.S. patent application Ser. No. 14/138,052 also claims the benefit of U.S. Provisional Patent Application No. 61/746,074 filed Dec. 26, 2012 and entitled "INFRARED IMAGING ENHANCEMENT WITH FUSION" which is hereby incorporated by reference in its entirety.

TECHNICAL FIELD

One or more embodiments of the invention relate generally to thermal imaging devices and more particularly, for example, to the use of thermal images to intelligently control illumination and monitoring operations of surveillance camera systems.

BACKGROUND

Many conventional cameras, such as surveillance cameras, use constant active illumination by visible or infrared light sources. Unfortunately, such light sources may attract many types of insects which may significantly degrade the quality and ability of such cameras to provide useful images of a scene. For example, spider webs may accumulate near or on the front side of the cameras, and such spider webs may in turn attract and retain additional insects and/or debris. Thus, the quality of surveillance images are often degraded due to obstruction and interference by insects and spider webs. Even worse, the presence or movement of these objects may be interpreted by surveillance camera systems as movement and therefore cause certain systems, such as conventional video motion detection (VMD) systems, to continue recording. For example, it is not uncommon to end up with long but meaningless surveillance recordings of nothing but spider webs swinging in the wind, moths fluttering around, or spiders building webs. Such problems are exacerbated by the fact that many conventional camera systems are not effective in discerning real objects of interest (e.g., persons, vehicles) from spurious objects (e.g., insects or spider webs) or environmental changes (e.g., changes in lighting conditions, whether conditions, or other changes in the background).

SUMMARY

Various techniques are disclosed for smart surveillance camera systems and methods using thermal imaging to intelligently control illumination and monitoring of a surveillance scene. For example, a smart camera system may include a thermal imager, an IR illuminator, a visible light illuminator, a visible/near IR (NIR) light camera, and a processor. The camera system may capture thermal images of the scene using the thermal imager, and analyze the thermal images to detect a presence and an attribute of an object in the scene. In response to the detection, various light sources of the camera system may be selectively operated to illuminate the object only when needed or desired, with a suitable type of light source, with a suitable beam angle and width, or in otherwise desirable manner. The visible/NIR light camera may also be selectively operated based on the detection to capture or record surveillance images containing objects of interest.

In one embodiment, a camera system includes a thermal imager comprising a focal plane array (FPA) configured to capture thermal images of a scene; a light source configured to illuminate the scene; a camera configured to capture additional images of the scene; and a processor configured to analyze the thermal images to determine an attribute associated with an object in the scene, and selectively operate the light source and the camera based on the attribute of the object.

In another embodiment, a method includes capturing, at a focal plane array (FPA) of a thermal imager, thermal images of a scene; analyzing the thermal images to determine an attribute associated with an object in the scene; and selectively operating a light source and a camera based on the attribute of the object, wherein the light source is configured to illuminate the scene, and the camera is configured to capture additional images of the scene.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
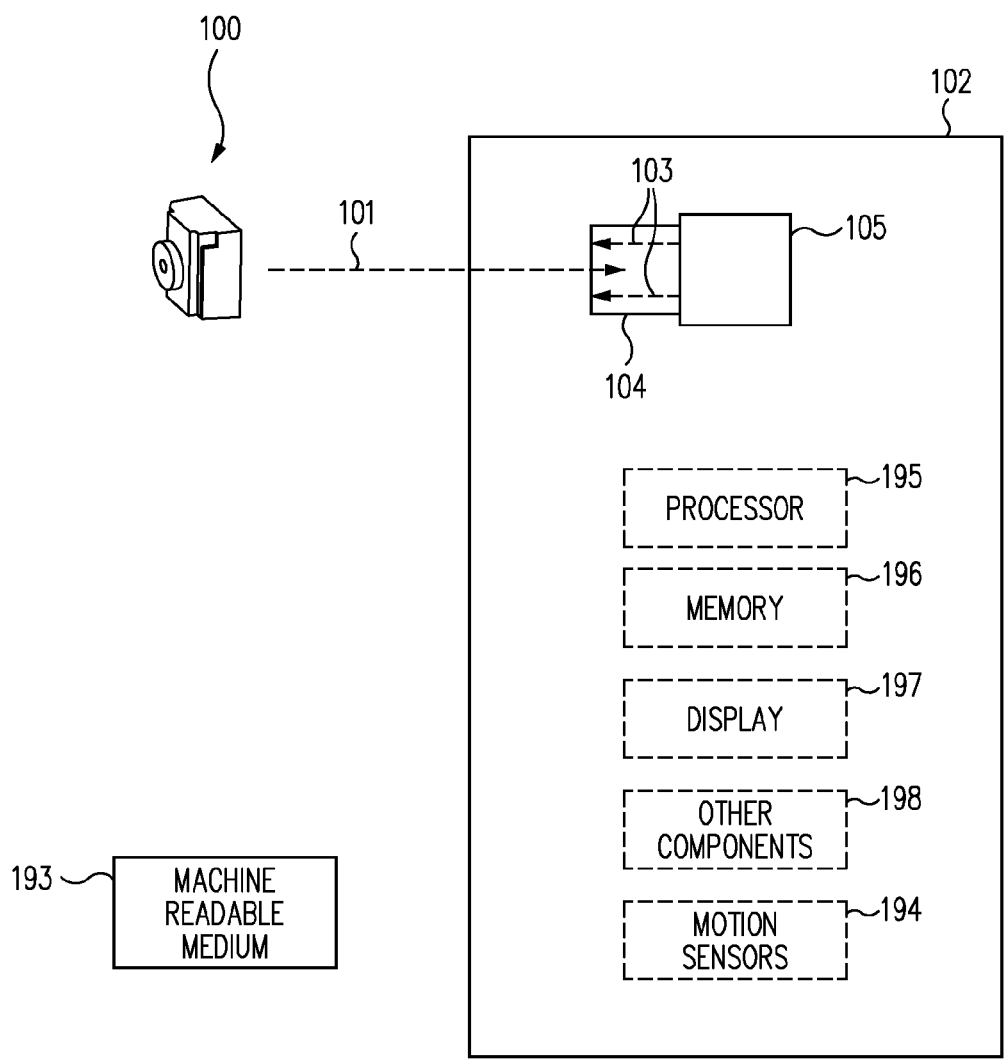
FIG. 1 illustrates an infrared imaging module configured to be implemented in a host device in accordance with an embodiment of the disclosure.

FIG. 1 illustrates an infrared imaging module 100 (e.g., an infrared camera or an infrared imaging device) configured to be implemented in a host device 102 in accordance with an embodiment of the disclosure. Infrared imaging module 100 may be implemented, for one or more embodiments, with a small form factor and in accordance with wafer level packaging techniques or other packaging techniques.

In one embodiment, infrared imaging module 100 may be configured to be implemented in a small portable host device 102, such as a mobile telephone, a tablet computing device, a laptop computing device, a personal digital assistant, a visible light camera, a music player, or any other appropriate mobile device. In this regard, infrared imaging module 100 may be used to provide infrared imaging features to host device 102. For example, infrared imaging module 100 may be configured to capture, process, and/or otherwise manage infrared images and provide such infrared images to host device 102 for use in any desired fashion (e.g., for further processing, to store in memory, to display, to use by various applications running on host device 102, to export to other devices, or other uses).

In various embodiments, infrared imaging module 100 may be configured to operate at low voltage levels and over a wide temperature range. For example, in one embodiment, infrared imaging module 100 may operate using a power supply of approximately 2.4 volts, 2.5 volts, 2.8 volts, or lower voltages, and operate over a temperature range of approximately −20 degrees C. to approximately +60 degrees C. (e.g., providing a suitable dynamic range and performance over an environmental temperature range of approximately 80 degrees C.). In one embodiment, by operating infrared imaging module 100 at low voltage levels, infrared imaging module 100 may experience reduced amounts of self heating in comparison with other types of infrared imaging devices. As a result, infrared imaging module 100 may be operated with reduced measures to compensate for such self heating.

Figure 2:
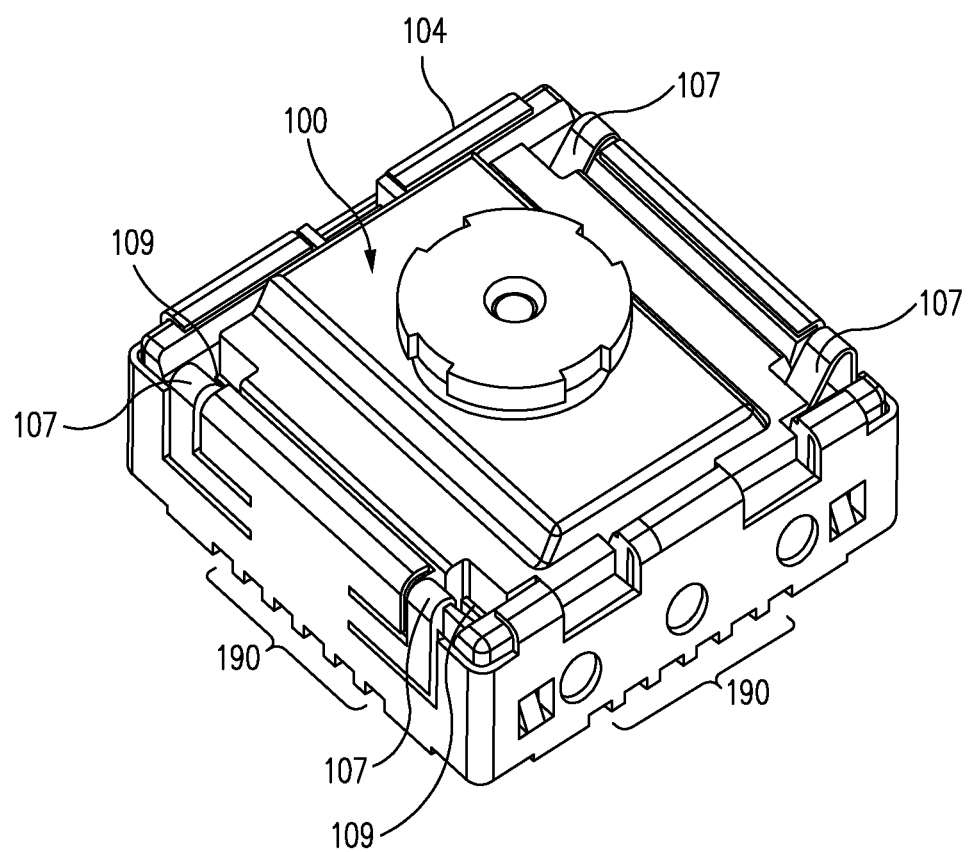
FIG. 2 illustrates an assembled infrared imaging module in accordance with an embodiment of the disclosure.

As shown in FIG. 1, host device 102 may include a socket 104, a shutter 105, motion sensors 194, a processor 195, a memory 196, a display 197, and/or other components 198. Socket 104 may be configured to receive infrared imaging module 100 as identified by arrow 101. In this regard, FIG. 2 illustrates infrared imaging module 100 assembled in socket 104 in accordance with an embodiment of the disclosure.

Motion sensors 194 may be implemented by one or more accelerometers, gyroscopes, or other appropriate devices that may be used to detect movement of host device 102. Motion sensors 194 may be monitored by and provide information to processing module 160 or processor 195 to detect motion. In various embodiments, motion sensors 194 may be implemented as part of host device 102 (as shown in FIG. 1), infrared imaging module 100, or other devices attached to or otherwise interfaced with host device 102.

Processor 195 may be implemented as any appropriate processing device (e.g., logic device, microcontroller, processor, application specific integrated circuit (ASIC), or other device) that may be used by host device 102 to execute appropriate instructions, such as software instructions provided in memory 196. Display 197 may be used to display captured and/or processed infrared images and/or other images, data, and information. Other components 198 may be used to implement any features of host device 102 as may be desired for various applications (e.g., clocks, temperature sensors, a visible light camera, or other components). In addition, a machine readable medium 193 may be provided for storing non-transitory instructions for loading into memory 196 and execution by processor 195.

In various embodiments, infrared imaging module 100 and socket 104 may be implemented for mass production to facilitate high volume applications, such as for implementation in mobile telephones or other devices (e.g., requiring small form factors). In one embodiment, the combination of infrared imaging module 100 and socket 104 may exhibit overall dimensions of approximately 8.5 mm by 8.5 mm by 5.9 mm while infrared imaging module 100 is installed in socket 104.

Figure 3:
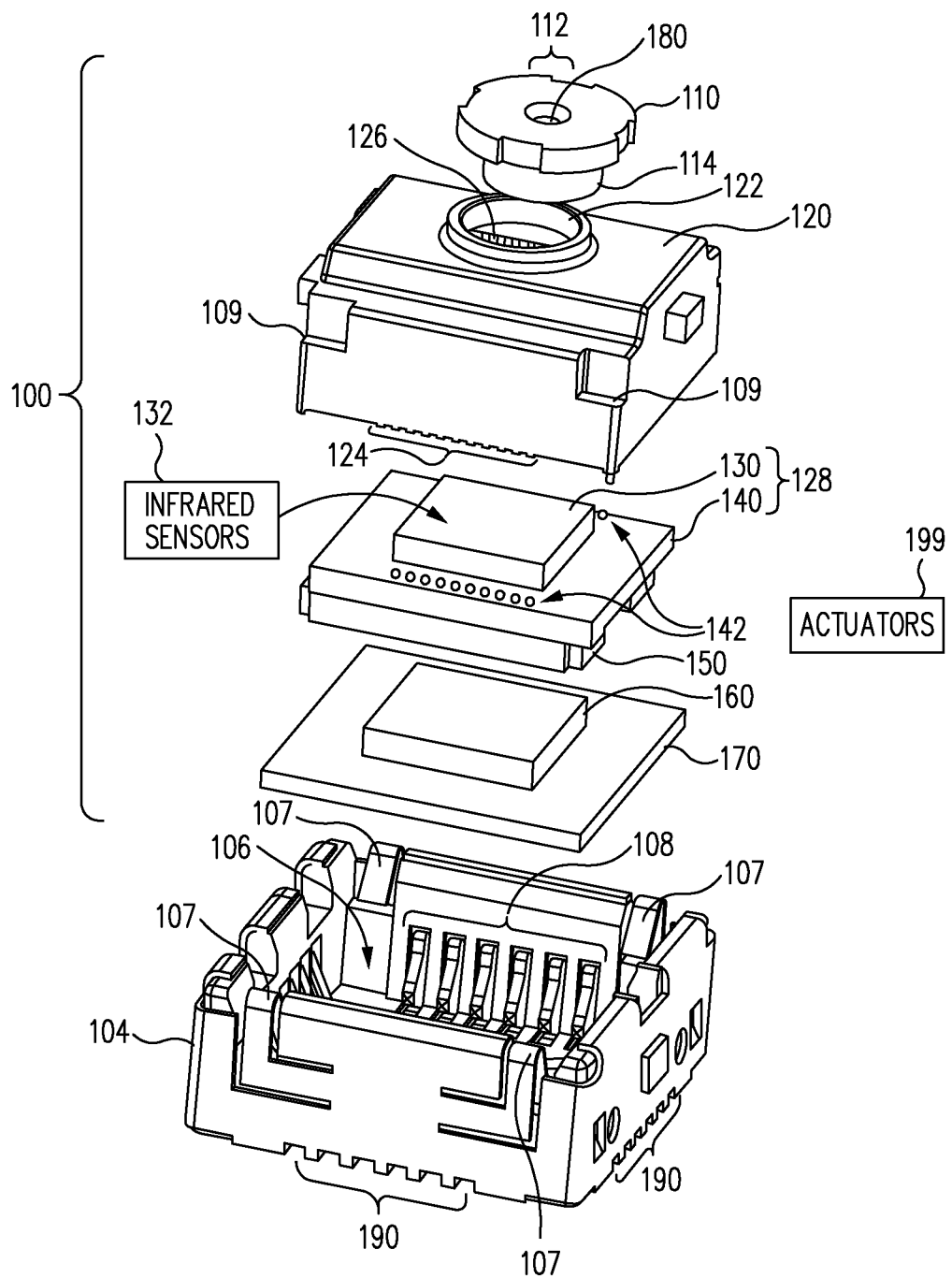
FIG. 3 illustrates an exploded view of an infrared imaging module juxtaposed over a socket in accordance with an embodiment of the disclosure.

FIG. 3 illustrates an exploded view of infrared imaging module 100 juxtaposed over socket 104 in accordance with an embodiment of the disclosure. Infrared imaging module 100 may include a lens barrel 110, a housing 120, an infrared sensor assembly 128, a circuit board 170, a base 150, and a processing module 160.

Lens barrel 110 may at least partially enclose an optical element 180 (e.g., a lens) which is partially visible in FIG. 3 through an aperture 112 in lens barrel 110. Lens barrel 110 may include a substantially cylindrical extension 114 which may be used to interface lens barrel 110 with an aperture 122 in housing 120.

Infrared sensor assembly 128 may be implemented, for example, with a cap 130 (e.g., a lid) mounted on a substrate 140. Infrared sensor assembly 128 may include a plurality of infrared sensors 132 (e.g., infrared detectors) implemented in an array or other fashion on substrate 140 and covered by cap 130. For example, in one embodiment, infrared sensor assembly 128 may be implemented as a focal plane array (FPA). Such a focal plane array may be implemented, for example, as a vacuum package assembly (e.g., sealed by cap 130 and substrate 140). In one embodiment, infrared sensor assembly 128 may be implemented as a wafer level package (e.g., infrared sensor assembly 128 may be singulated from a set of vacuum package assemblies provided on a wafer). In one embodiment, infrared sensor assembly 128 may be implemented to operate using a power supply of approximately 2.4 volts, 2.5 volts, 2.8 volts, or similar voltages.

Infrared sensors 132 may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. In one embodiment, infrared sensor assembly 128 may be provided in accordance with wafer level packaging techniques.

Infrared sensors 132 may be implemented, for example, as microbolometers or other types of thermal imaging infrared sensors arranged in any desired array pattern to provide a plurality of pixels. In one embodiment, infrared sensors 132 may be implemented as vanadium oxide (VOx) detectors with a 17 μm pixel pitch. In various embodiments, arrays of approximately 32 by 32 infrared sensors 132, approximately 64 by 64 infrared sensors 132, approximately 80 by 64 infrared sensors 132, or other array sizes may be used.

Substrate 140 may include various circuitry including, for example, a read out integrated circuit (ROIC) with dimensions less than approximately 5.5 mm by 5.5 mm in one embodiment. Substrate 140 may also include bond pads 142 that may be used to contact complementary connections positioned on inside surfaces of housing 120 when infrared imaging module 100 is assembled as shown in FIGS. 5A, 5B, and 5C. In one embodiment, the ROTC may be implemented with low-dropout regulators (LDO) to perform voltage regulation to reduce power supply noise introduced to infrared sensor assembly 128 and thus provide an improved power supply rejection ratio (PSRR). Moreover, by implementing the LDO with the ROIC (e.g., within a wafer level package), less die area may be consumed and fewer discrete die (or chips) are needed.

Figure 4:
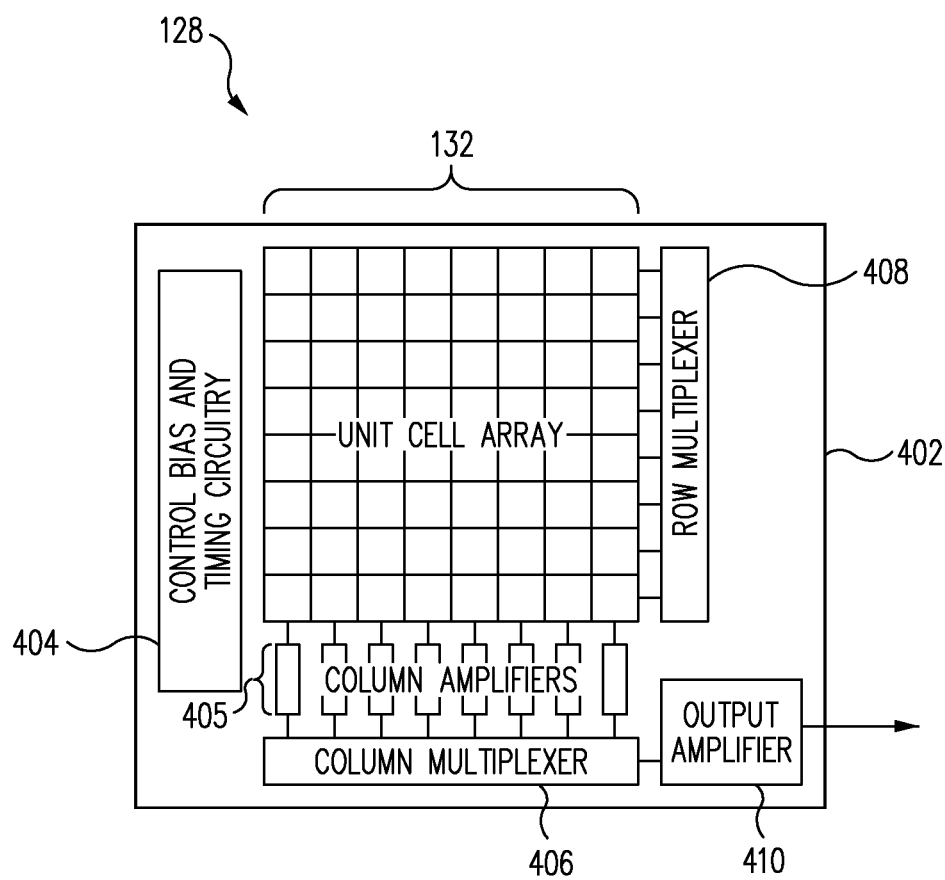
FIG. 4 illustrates a block diagram of an infrared sensor assembly including an array of infrared sensors in accordance with an embodiment of the disclosure.

FIG. 4 illustrates a block diagram of infrared sensor assembly 128 including an array of infrared sensors 132 in accordance with an embodiment of the disclosure. In the illustrated embodiment, infrared sensors 132 are provided as part of a unit cell array of a ROTC 402. ROIC 402 includes bias generation and timing control circuitry 404, column amplifiers 405, a column multiplexer 406, a row multiplexer 408, and an output amplifier 410. Image frames (e.g., thermal images) captured by infrared sensors 132 may be provided by output amplifier 410 to processing module 160, processor 195, and/or any other appropriate components to perform various processing techniques described herein. Although an 8 by 8 array is shown in FIG. 4, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

Infrared sensor assembly 128 may capture images (e.g., image frames) and provide such images from its ROIC at various rates. Processing module 160 may be used to perform appropriate processing of captured infrared images and may be implemented in accordance with any appropriate architecture. In one embodiment, processing module 160 may be implemented as an ASIC. In this regard, such an ASIC may be configured to perform image processing with high performance and/or high efficiency. In another embodiment, processing module 160 may be implemented with a general purpose central processing unit (CPU) which may be configured to execute appropriate software instructions to perform image processing, coordinate and perform image processing with various image processing blocks, coordinate interfacing between processing module 160 and host device 102, and/or other operations. In yet another embodiment, processing module 160 may be implemented with a field programmable gate array (FPGA). Processing module 160 may be implemented with other types of processing and/or logic circuits in other embodiments as would be understood by one skilled in the art.

In these and other embodiments, processing module 160 may also be implemented with other components where appropriate, such as, volatile memory, non-volatile memory, and/or one or more interfaces (e.g., infrared detector interfaces, inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces).

In some embodiments, infrared imaging module 100 may further include one or more actuators 199 which may be used to adjust the focus of infrared image frames captured by infrared sensor assembly 128. For example, actuators 199 may be used to move optical element 180, infrared sensors 132, and/or other components relative to each other to selectively focus and defocus infrared image frames in accordance with techniques described herein. Actuators 199 may be implemented in accordance with any type of motion-inducing apparatus or mechanism, and may positioned at any location within or external to infrared imaging module 100 as appropriate for different applications.

When infrared imaging module 100 is assembled, housing 120 may substantially enclose infrared sensor assembly 128, base 150, and processing module 160. Housing 120 may facilitate connection of various components of infrared imaging module 100. For example, in one embodiment, housing 120 may provide electrical connections 126 to connect various components as further described.

Electrical connections 126 (e.g., conductive electrical paths, traces, or other types of connections) may be electrically connected with bond pads 142 when infrared imaging module 100 is assembled. In various embodiments, electrical connections 126 may be embedded in housing 120, provided on inside surfaces of housing 120, and/or otherwise provided by housing 120. Electrical connections 126 may terminate in connections 124 protruding from the bottom surface of housing 120 as shown in FIG. 3. Connections 124 may connect with circuit board 170 when infrared imaging module 100 is assembled (e.g., housing 120 may rest atop circuit board 170 in various embodiments). Processing module 160 may be electrically connected with circuit board 170 through appropriate electrical connections. As a result, infrared sensor assembly 128 may be electrically connected with processing module 160 through, for example, conductive electrical paths provided by: bond pads 142, complementary connections on inside surfaces of housing 120, electrical connections 126 of housing 120, connections 124, and circuit board 170. Advantageously, such an arrangement may be implemented without requiring wire bonds to be provided between infrared sensor assembly 128 and processing module 160.

In various embodiments, electrical connections 126 in housing 120 may be made from any desired material (e.g., copper or any other appropriate conductive material). In one embodiment, electrical connections 126 may aid in dissipating heat from infrared imaging module 100.

Other connections may be used in other embodiments. For example, in one embodiment, sensor assembly 128 may be attached to processing module 160 through a ceramic board that connects to sensor assembly 128 by wire bonds and to processing module 160 by a ball grid array (BGA). In another embodiment, sensor assembly 128 may be mounted directly on a rigid flexible board and electrically connected with wire bonds, and processing module 160 may be mounted and connected to the rigid flexible board with wire bonds or a BGA.

The various implementations of infrared imaging module 100 and host device 102 set forth herein are provided for purposes of example, rather than limitation. In this regard, any of the various techniques described herein may be applied to any infrared camera system, infrared imager, or other device for performing infrared/thermal imaging.

Substrate 140 of infrared sensor assembly 128 may be mounted on base 150. In various embodiments, base 150 (e.g., a pedestal) may be made, for example, of copper formed by metal injection molding (MIM) and provided with a black oxide or nickel-coated finish. In various embodiments, base 150 may be made of any desired material, such as for example zinc, aluminum, or magnesium, as desired for a given application and may be formed by any desired applicable process, such as for example aluminum casting, MIM, or zinc rapid casting, as may be desired for particular applications. In various embodiments, base 150 may be implemented to provide structural support, various circuit paths, thermal heat sink properties, and other features where appropriate. In one embodiment, base 150 may be a multi-layer structure implemented at least in part using ceramic material.

In various embodiments, circuit board 170 may receive housing 120 and thus may physically support the various components of infrared imaging module 100. In various embodiments, circuit board 170 may be implemented as a printed circuit board (e.g., an FR4 circuit board or other types of circuit boards), a rigid or flexible interconnect (e.g., tape or other type of interconnects), a flexible circuit substrate, a flexible plastic substrate, or other appropriate structures. In various embodiments, base 150 may be implemented with the various features and attributes described for circuit board 170, and vice versa.

Socket 104 may include a cavity 106 configured to receive infrared imaging module 100 (e.g., as shown in the assembled view of FIG. 2). Infrared imaging module 100 and/or socket 104 may include appropriate tabs, arms, pins, fasteners, or any other appropriate engagement members which may be used to secure infrared imaging module 100 to or within socket 104 using friction, tension, adhesion, and/or any other appropriate manner. Socket 104 may include engagement members 107 that may engage surfaces 109 of housing 120 when infrared imaging module 100 is inserted into a cavity 106 of socket 104. Other types of engagement members may be used in other embodiments.

Infrared imaging module 100 may be electrically connected with socket 104 through appropriate electrical connections (e.g., contacts, pins, wires, or any other appropriate connections). For example, socket 104 may include electrical connections 108 which may contact corresponding electrical connections of infrared imaging module 100 (e.g., interconnect pads, contacts, or other electrical connections on side or bottom surfaces of circuit board 170, bond pads 142 or other electrical connections on base 150, or other connections). Electrical connections 108 may be made from any desired material (e.g., copper or any other appropriate conductive material). In one embodiment, electrical connections 108 may be mechanically biased to press against electrical connections of infrared imaging module 100 when infrared imaging module 100 is inserted into cavity 106 of socket 104. In one embodiment, electrical connections 108 may at least partially secure infrared imaging module 100 in socket 104. Other types of electrical connections may be used in other embodiments.

Socket 104 may be electrically connected with host device 102 through similar types of electrical connections. For example, in one embodiment, host device 102 may include electrical connections (e.g., soldered connections, snap-in connections, or other connections) that connect with electrical connections 108 passing through apertures 190. In various embodiments, such electrical connections may be made to the sides and/or bottom of socket 104.

Various components of infrared imaging module 100 may be implemented with flip chip technology which may be used to mount components directly to circuit boards without the additional clearances typically needed for wire bond connections. Flip chip connections may be used, as an example, to reduce the overall size of infrared imaging module 100 for use in compact small form factor applications. For example, in one embodiment, processing module 160 may be mounted to circuit board 170 using flip chip connections. For example, infrared imaging module 100 may be implemented with such flip chip configurations.

In various embodiments, infrared imaging module 100 and/or associated components may be implemented in accordance with various techniques (e.g., wafer level packaging techniques) as set forth in U.S. patent application Ser. No. 12/844,124 filed Jul. 27, 2010, and U.S. Provisional Patent Application No. 61/469,651 filed Mar. 30, 2011, which are incorporated herein by reference in their entirety. Furthermore, in accordance with one or more embodiments, infrared imaging module 100 and/or associated components may be implemented, calibrated, tested, and/or used in accordance with various techniques, such as for example as set forth in U.S. Pat. No. 7,470,902 issued Dec. 30, 2008, U.S. Pat. No. 6,028,309 issued Feb. 22, 2000, U.S. Pat. No. 6,812,465 issued Nov. 2, 2004, U.S. Pat. No. 7,034,301 issued Apr. 25, 2006, U.S. Pat. No. 7,679,048 issued Mar. 16, 2010, U.S. Pat. No. 7,470,904 issued Dec. 30, 2008, U.S. patent application Ser. No. 12/202,880 filed Sep. 2, 2008, and U.S. patent application Ser. No. 12/202,896 filed Sep. 2, 2008, which are incorporated herein by reference in their entirety.

In some embodiments, host device 102 may include other components 198 such as a non-thermal camera (e.g., a visible light camera or other type of non-thermal imager such as a near infrared and/or short wave infrared camera, all of which are collectively referred to herein as a visible/NIR camera or visible/NIR light camera). The non-thermal camera may be a small form factor imaging module or imaging device, and may, in some embodiments, be implemented in a manner similar to the various embodiments of infrared imaging module 100 disclosed herein, with one or more sensors and/or sensor arrays responsive to radiation in non-thermal spectrums (e.g., radiation in visible light wavelengths, ultraviolet wavelengths, and/or other non-thermal wavelengths). For example, in some embodiments, the non-thermal camera may be implemented with a charge-coupled device (CCD) sensor, an electron multiplying CCD (EM- CCD) sensor, a complementary metal-oxide-semiconductor (CMOS) sensor, a scientific CMOS (sCMOS) sensor, or other filters and/or sensors.

In some embodiments, the non-thermal camera may be co-located with infrared imaging module 100 and oriented such that a field-of-view (FOV) of the non-thermal camera at least partially overlaps a FOV of infrared imaging module 100. In one example, infrared imaging module 100 and a non-thermal camera may be implemented as a dual sensor module sharing a common substrate according to various techniques described in U.S. Provisional Patent Application No. 61/748,018 filed Dec. 31, 2012, which is incorporated herein by reference.

For embodiments having such a non-thermal light camera, various components (e.g., processor 195, processing module 160, and/or other processing component) may be configured to superimpose, fuse, blend, or otherwise combine infrared images (e.g., including thermal images) captured by infrared imaging module 100 and non-thermal images (e.g., including visible light images) captured by a non-thermal camera, whether captured at substantially the same time or different times (e.g., time-spaced over hours, days, daytime versus nighttime, and/or otherwise).

In some embodiments, thermal and non-thermal images may be processed to generate combined images (e.g., one or more processes performed on such images in some embodiments). For example, scene-based NUC processing may be performed (as further described herein), true color processing may be performed, and/or high contrast processing may be performed. In addition, active illumination may be optionally used (e.g., in visible, near infrared, short wave infrared, and/or any other non-thermal wavebands as desired) to selectively illuminate a scene for capturing non-thermal images.

Regarding true color processing, thermal images may be blended with non-thermal images by, for example, blending a radiometric component of a thermal image with a corresponding component of a non-thermal image according to a blending parameter, which may be adjustable by a user and/or machine in some embodiments. For example, luminance or chrominance components of the thermal and non-thermal images may be combined according to the blending parameter. In one embodiment, such blending techniques may be referred to as true color infrared imagery. For example, in daytime imaging, a blended image may comprise a non-thermal color image, which includes a luminance component and a chrominance component, with its luminance value replaced and/or blended with the luminance value from a thermal image. The use of the luminance data from the thermal image causes the intensity of the true non-thermal color image to brighten or dim based on the temperature of the object. As such, these blending techniques provide thermal imaging for daytime or visible light images.

Regarding high contrast processing, high spatial frequency content may be obtained from one or more of the thermal and non-thermal images (e.g., by performing high pass filtering, difference imaging, and/or other techniques). A combined image may include a radiometric component of a thermal image and a blended component including infrared (e.g., thermal) characteristics of a scene blended with the high spatial frequency content, according to a blending parameter, which may be adjustable by a user and/or machine in some embodiments. In some embodiments, high spatial frequency content from non-thermal images may be blended with thermal images by superimposing the high spatial frequency content onto the thermal images, where the high spatial frequency content replaces or overwrites those portions of the thermal images corresponding to where the high spatial frequency content exists. For example, the high spatial frequency content may include edges of objects depicted in images of a scene, but may not exist within the interior of such objects. In such embodiments, blended image data may simply include the high spatial frequency content, which may subsequently be encoded into one or more components of combined images.

For example, a radiometric component of thermal image may be a chrominance component of the thermal image, and the high spatial frequency content may be derived from the luminance and/or chrominance components of a non-thermal image. In this embodiment, a combined image may include the radiometric component (e.g., the chrominance component of the thermal image) encoded into a chrominance component of the combined image and the high spatial frequency content directly encoded (e.g., as blended image data but with no thermal image contribution) into a luminance component of the combined image. By doing so, a radiometric calibration of the radiometric component of the thermal image may be retained. In similar embodiments, blended image data may include the high spatial frequency content added to a luminance component of the thermal images, and the resulting blended data encoded into a luminance component of resulting combined images.

For example, any of the techniques disclosed in the following applications may be used in various embodiments: U.S. patent application Ser. No. 12/477,828 filed Jun. 3, 2009; U.S. patent application Ser. No. 12/766,739 filed Apr. 23, 2010; U.S. patent application Ser. No. 13/105,765 filed May 11, 2011; U.S. patent application Ser. No. 13/437,645 filed Apr. 2, 2012; U.S. Provisional Patent Application No. 61/473,207 filed Apr. 8, 2011; U.S. Provisional Patent Application No. 61/746,069 filed Dec. 26, 2012; U.S. Provisional Patent Application No. 61/746,074 filed Dec. 26, 2012; U.S. Provisional Patent Application No. 61/748,018 filed Dec. 31, 2012; U.S. Provisional Patent Application No. 61/792,582 filed Mar. 15, 2013; U.S. Provisional Patent Application No. 61/793,952 filed Mar. 15, 2013; and International Patent Application No. PCT/EP2011/056432 filed Apr. 21, 2011, all of such applications are incorporated herein by reference in their entirety. Any of the techniques described herein, or described in other applications or patents referenced herein, may be applied to any of the various thermal devices, non-thermal devices, and uses described herein.

Referring again to FIG. 1, in various embodiments, host device 102 may include shutter 105. In this regard, shutter 105 may be selectively positioned over socket 104 (e.g., as identified by arrows 103) while infrared imaging module 100 is installed therein. In this regard, shutter 105 may be used, for example, to protect infrared imaging module 100 when not in use. Shutter 105 may also be used as a temperature reference as part of a calibration process (e.g., a NUC process or other calibration processes) for infrared imaging module 100 as would be understood by one skilled in the art.

In various embodiments, shutter 105 may be made from various materials such as, for example, polymers, glass, aluminum (e.g., painted or anodized) or other materials. In various embodiments, shutter 105 may include one or more coatings to selectively filter electromagnetic radiation and/or adjust various optical properties of shutter 105 (e.g., a uniform blackbody coating or a reflective gold coating).

In another embodiment, shutter 105 may be fixed in place to protect infrared imaging module 100 at all times. In this case, shutter 105 or a portion of shutter 105 may be made from appropriate materials (e.g., polymers or infrared transmitting materials such as silicon, germanium, zinc selenide, or chalcogenide glasses) that do not substantially filter desired infrared wavelengths. In another embodiment, a shutter may be implemented as part of infrared imaging module 100 (e.g., within or as part of a lens barrel or other components of infrared imaging module 100), as would be understood by one skilled in the art.

Alternatively, in another embodiment, a shutter (e.g., shutter 105 or other type of external or internal shutter) need not be provided, but rather a NUC process or other type of calibration may be performed using shutterless techniques. In another embodiment, a NUC process or other type of calibration using shutterless techniques may be performed in combination with shutter-based techniques.

Infrared imaging module 100 and host device 102 may be implemented in accordance with any of the various techniques set forth in U.S. Provisional Patent Application No. 61/495,873 filed Jun. 10, 2011, U.S. Provisional Patent Application No. 61/495,879 filed Jun. 10, 2011, and U.S. Provisional Patent Application No. 61/495,888 filed Jun. 10, 2011, which are incorporated herein by reference in their entirety.

In various embodiments, the components of host device 102 and/or infrared imaging module 100 may be implemented as a local or distributed system with components in communication with each other over wired and/or wireless networks. Accordingly, the various operations identified in this disclosure may be performed by local and/or remote components as may be desired in particular implementations.

Figure 5:
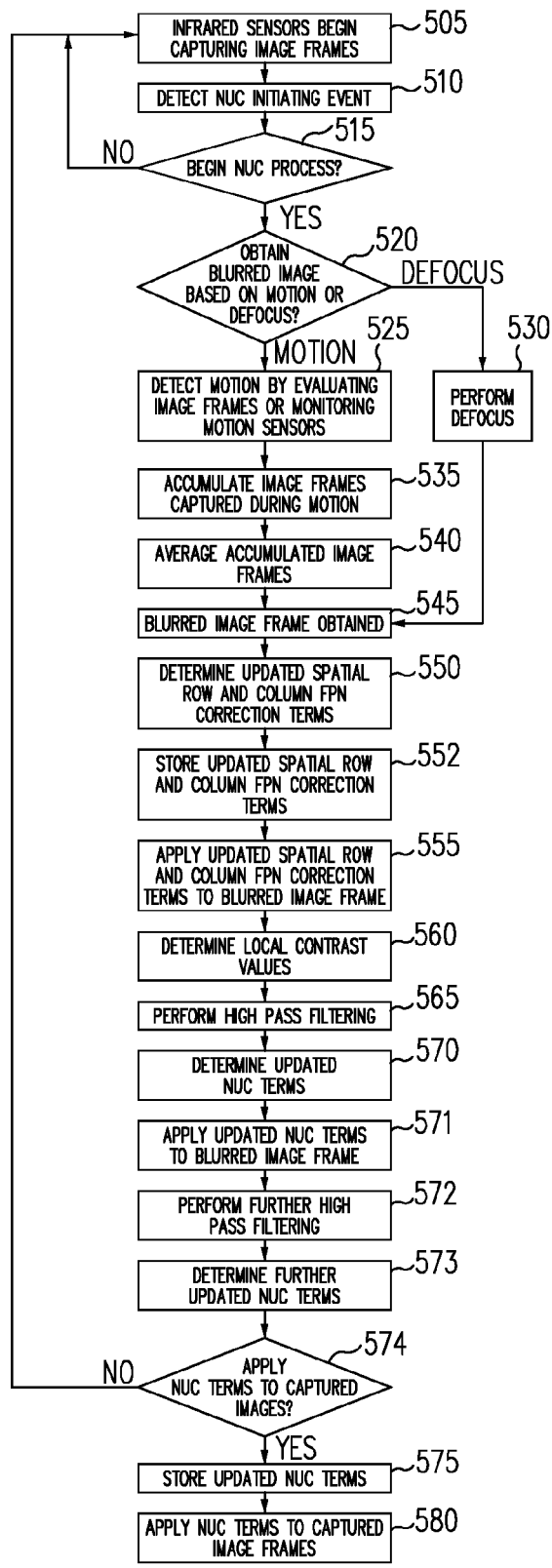
FIG. 5 illustrates a flow diagram of various operations to determine NUC terms in accordance with an embodiment of the disclosure.

FIG. 5 illustrates a flow diagram of various operations to determine NUC terms in accordance with an embodiment of the disclosure. In some embodiments, the operations of FIG. 5 may be performed by processing module 160 or processor 195 (both also generally referred to as a processor) operating on image frames captured by infrared sensors 132.

In block 505, infrared sensors 132 begin capturing image frames of a scene. Typically, the scene will be the real world environment in which host device 102 is currently located. In this regard, shutter 105 (if optionally provided) may be opened to permit infrared imaging module to receive infrared radiation from the scene. Infrared sensors 132 may continue capturing image frames during all operations shown in FIG. 5. In this regard, the continuously captured image frames may be used for various operations as further discussed. In one embodiment, the captured image frames may be temporally filtered (e.g., in accordance with the process of block 826 further described herein with regard to FIG. 8) and be processed by other terms (e.g., factory gain terms 812, factory offset terms 816, previously determined NUC terms 817, column FPN terms 820, and row FPN terms 824 as further described herein with regard to FIG. 8) before they are used in the operations shown in FIG. 5.

In block 510, a NUC process initiating event is detected. In one embodiment, the NUC process may be initiated in response to physical movement of host device 102. Such movement may be detected, for example, by motion sensors 194 which may be polled by a processor. In one example, a user may move host device 102 in a particular manner, such as by intentionally waving host device 102 back and forth in an "erase" or "swipe" movement. In this regard, the user may move host device 102 in accordance with a predetermined speed and direction (velocity), such as in an up and down, side to side, or other pattern to initiate the NUC process. In this example, the use of such movements may permit the user to intuitively operate host device 102 to simulate the "erasing" of noise in captured image frames.

In another example, a NUC process may be initiated by host device 102 if motion exceeding a threshold value is exceeded (e.g., motion greater than expected for ordinary use). It is contemplated that any desired type of spatial translation of host device 102 may be used to initiate the NUC process.

In yet another example, a NUC process may be initiated by host device 102 if a minimum time has elapsed since a previously performed NUC process. In a further example, a NUC process may be initiated by host device 102 if infrared imaging module 100 has experienced a minimum temperature change since a previously performed NUC process. In a still further example, a NUC process may be continuously initiated and repeated.

In block 515, after a NUC process initiating event is detected, it is determined whether the NUC process should actually be performed. In this regard, the NUC process may be selectively initiated based on whether one or more additional conditions are met. For example, in one embodiment, the NUC process may not be performed unless a minimum time has elapsed since a previously performed NUC process. In another embodiment, the NUC process may not be performed unless infrared imaging module 100 has experienced a minimum temperature change since a previously performed NUC process. Other criteria or conditions may be used in other embodiments. If appropriate criteria or conditions have been met, then the flow diagram continues to block 520. Otherwise, the flow diagram returns to block 505.

In the NUC process, blurred image frames may be used to determine NUC terms which may be applied to captured image frames to correct for FPN. As discussed, in one embodiment, the blurred image frames may be obtained by accumulating multiple image frames of a moving scene (e.g., captured while the scene and/or the thermal imager is in motion). In another embodiment, the blurred image frames may be obtained by defocusing an optical element or other component of the thermal imager.

Accordingly, in block 520 a choice of either approach is provided. If the motion-based approach is used, then the flow diagram continues to block 525. If the defocus-based approach is used, then the flow diagram continues to block 530.

Referring now to the motion-based approach, in block 525 motion is detected. For example, in one embodiment, motion may be detected based on the image frames captured by infrared sensors 132. In this regard, an appropriate motion detection process (e.g., an image registration process, a frame-to-frame difference calculation, or other appropriate process) may be applied to captured image frames to determine whether motion is present (e.g., whether static or moving image frames have been captured). For example, in one embodiment, it can be determined whether pixels or regions around the pixels of consecutive image frames have changed more than a user defined amount (e.g., a percentage and/or threshold value). If at least a given percentage of pixels have changed by at least the user defined amount, then motion will be detected with sufficient certainty to proceed to block 535.

In another embodiment, motion may be determined on a per pixel basis, wherein only pixels that exhibit significant changes are accumulated to provide the blurred image frame. For example, counters may be provided for each pixel and used to ensure that the same number of pixel values are accumulated for each pixel, or used to average the pixel values based on the number of pixel values actually accumulated for each pixel. Other types of image-based motion detection may be performed such as performing a Radon transform.

In another embodiment, motion may be detected based on data provided by motion sensors 194. In one embodiment, such motion detection may include detecting whether host device 102 is moving along a relatively straight trajectory through space. For example, if host device 102 is moving along a relatively straight trajectory, then it is possible that certain objects appearing in the imaged scene may not be sufficiently blurred (e.g., objects in the scene that may be aligned with or moving substantially parallel to the straight trajectory). Thus, in such an embodiment, the motion detected by motion sensors 194 may be conditioned on host device 102 exhibiting, or not exhibiting, particular trajectories.

In yet another embodiment, both a motion detection process and motion sensors 194 may be used. Thus, using any of these various embodiments, a determination can be made as to whether or not each image frame was captured while at least a portion of the scene and host device 102 were in motion relative to each other (e.g., which may be caused by host device 102 moving relative to the scene, at least a portion of the scene moving relative to host device 102, or both).

It is expected that the image frames for which motion was detected may exhibit some secondary blurring of the captured scene (e.g., blurred thermal image data associated with the scene) due to the thermal time constants of infrared sensors 132 (e.g., microbolometer thermal time constants) interacting with the scene movement.

In block 535, image frames for which motion was detected are accumulated. For example, if motion is detected for a continuous series of image frames, then the image frames of the series may be accumulated. As another example, if motion is detected for only some image frames, then the non-moving image frames may be skipped and not included in the accumulation. Thus, a continuous or discontinuous set of image frames may be selected to be accumulated based on the detected motion.

In block 540, the accumulated image frames are averaged to provide a blurred image frame. Because the accumulated image frames were captured during motion, it is expected that actual scene information will vary between the image frames and thus cause the scene information to be further blurred in the resulting blurred image frame (block 545).

In contrast, FPN (e.g., caused by one or more components of infrared imaging module 100) will remain fixed over at least short periods of time and over at least limited changes in scene irradiance during motion. As a result, image frames captured in close proximity in time and space during motion will suffer from identical or at least very similar FPN. Thus, although scene information may change in consecutive image frames, the FPN will stay essentially constant. By averaging, multiple image frames captured during motion will blur the scene information, but will not blur the FPN. As a result, FPN will remain more clearly defined in the blurred image frame provided in block 545 than the scene information.

In one embodiment, 32 or more image frames are accumulated and averaged in blocks 535 and 540. However, any desired number of image frames may be used in other embodiments, but with generally decreasing correction accuracy as frame count is decreased.

Referring now to the defocus-based approach, in block 530, a defocus operation may be performed to intentionally defocus the image frames captured by infrared sensors 132. For example, in one embodiment, one or more actuators 199 may be used to adjust, move, or otherwise translate optical element 180, infrared sensor assembly 128, and/or other components of infrared imaging module 100 to cause infrared sensors 132 to capture a blurred (e.g., unfocused) image frame of the scene. Other non-actuator based techniques are also contemplated for intentionally defocusing infrared image frames such as, for example, manual (e.g., user-initiated) defocusing.

Although the scene may appear blurred in the image frame, FPN (e.g., caused by one or more components of infrared imaging module 100) will remain unaffected by the defocusing operation. As a result, a blurred image frame of the scene will be provided (block 545) with FPN remaining more clearly defined in the blurred image than the scene information.

In the above discussion, the defocus-based approach has been described with regard to a single captured image frame. In another embodiment, the defocus-based approach may include accumulating multiple image frames while the infrared imaging module 100 has been defocused and averaging the defocused image frames to remove the effects of temporal noise and provide a blurred image frame in block 545.

Thus, it will be appreciated that a blurred image frame may be provided in block 545 by either the motion-based approach or the defocus-based approach. Because much of the scene information will be blurred by either motion, defocusing, or both, the blurred image frame may be effectively considered a low pass filtered version of the original captured image frames with respect to scene information.

In block 550, the blurred image frame is processed to determine updated row and column FPN terms (e.g., if row and column FPN terms have not been previously determined then the updated row and column FPN terms may be new row and column FPN terms in the first iteration of block 550). As used in this disclosure, the terms row and column may be used interchangeably depending on the orientation of infrared sensors 132 and/or other components of infrared imaging module 100.

In one embodiment, block 550 includes determining a spatial FPN correction term for each row of the blurred image frame (e.g., each row may have its own spatial FPN correction term), and also determining a spatial FPN correction term for each column of the blurred image frame (e.g., each column may have its own spatial FPN correction term). Such processing may be used to reduce the spatial and slowly varying (1/f) row and column FPN inherent in thermal imagers caused by, for example, 1/f noise characteristics of amplifiers in ROIC 402 which may manifest as vertical and horizontal stripes in image frames.

Advantageously, by determining spatial row and column FPN terms using the blurred image frame, there will be a reduced risk of vertical and horizontal objects in the actual imaged scene from being mistaken for row and column noise (e.g., real scene content will be blurred while FPN remains unblurred).

Figure 6:
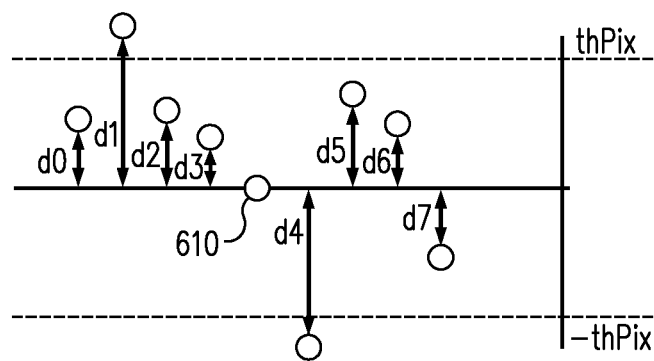
FIG. 6 illustrates differences between neighboring pixels in accordance with an embodiment of the disclosure.

In one embodiment, row and column FPN terms may be determined by considering differences between neighboring pixels of the blurred image frame. For example, FIG. 6 illustrates differences between neighboring pixels in accordance with an embodiment of the disclosure. Specifically, in FIG. 6 a pixel 610 is compared to its 8 nearest horizontal neighbors: d0-d3 on one side and d4-d7 on the other side. Differences between the neighbor pixels can be averaged to obtain an estimate of the offset error of the illustrated group of pixels. An offset error may be calculated for each pixel in a row or column and the average result may be used to correct the entire row or column.

To prevent real scene data from being interpreted as noise, upper and lower threshold values may be used (thPix and −thPix). Pixel values falling outside these threshold values (pixels d1 and d4 in this example) are not used to obtain the offset error. In addition, the maximum amount of row and column FPN correction may be limited by these threshold values.

Further techniques for performing spatial row and column FPN correction processing are set forth in U.S. patent application Ser. No. 12/396,340 filed Mar. 2, 2009 which is incorporated herein by reference in its entirety.

Referring again to FIG. 5, the updated row and column FPN terms determined in block 550 are stored (block 552) and applied (block 555) to the blurred image frame provided in block 545. After these terms are applied, some of the spatial row and column FPN in the blurred image frame may be reduced. However, because such terms are applied generally to rows and columns, additional FPN may remain such as spatially uncorrelated FPN associated with pixel to pixel drift or other causes. Neighborhoods of spatially correlated FPN may also remain which may not be directly associated with individual rows and columns. Accordingly, further processing may be performed as discussed below to determine NUC terms.

In block 560, local contrast values (e.g., edges or absolute values of gradients between adjacent or small groups of pixels) in the blurred image frame are determined. If scene information in the blurred image frame includes contrasting areas that have not been significantly blurred (e.g., high contrast edges in the original scene data), then such features may be identified by a contrast determination process in block 560.

For example, local contrast values in the blurred image frame may be calculated, or any other desired type of edge detection process may be applied to identify certain pixels in the blurred image as being part of an area of local contrast. Pixels that are marked in this manner may be considered as containing excessive high spatial frequency scene information that would be interpreted as FPN (e.g., such regions may correspond to portions of the scene that have not been sufficiently blurred). As such, these pixels may be excluded from being used in the further determination of NUC terms. In one embodiment, such contrast detection processing may rely on a threshold that is higher than the expected contrast value associated with FPN (e.g., pixels exhibiting a contrast value higher than the threshold may be considered to be scene information, and those lower than the threshold may be considered to be exhibiting FPN).

In one embodiment, the contrast determination of block 560 may be performed on the blurred image frame after row and column FPN terms have been applied to the blurred image frame (e.g., as shown in FIG. 5). In another embodiment, block 560 may be performed prior to block 550 to determine contrast before row and column FPN terms are determined (e.g., to prevent scene based contrast from contributing to the determination of such terms).

Following block 560, it is expected that any high spatial frequency content remaining in the blurred image frame may be generally attributed to spatially uncorrelated FPN. In this regard, following block 560, much of the other noise or actual desired scene based information has been removed or excluded from the blurred image frame due to: intentional blurring of the image frame (e.g., by motion or defocusing in blocks 520 through 545), application of row and column FPN terms (block 555), and contrast determination (block 560).

Thus, it can be expected that following block 560, any remaining high spatial frequency content (e.g., exhibited as areas of contrast or differences in the blurred image frame) may be attributed to spatially uncorrelated FPN. Accordingly, in block 565, the blurred image frame is high pass filtered. In one embodiment, this may include applying a high pass filter to extract the high spatial frequency content from the blurred image frame. In another embodiment, this may include applying a low pass filter to the blurred image frame and taking a difference between the low pass filtered image frame and the unfiltered blurred image frame to obtain the high spatial frequency content. In accordance with various embodiments of the present disclosure, a high pass filter may be implemented by calculating a mean difference between a sensor signal (e.g., a pixel value) and its neighbors.

In block 570, a flat field correction process is performed on the high pass filtered blurred image frame to determine updated NUC terms (e.g., if a NUC process has not previously been performed then the updated NUC terms may be new NUC terms in the first iteration of block 570).

Figure 7:
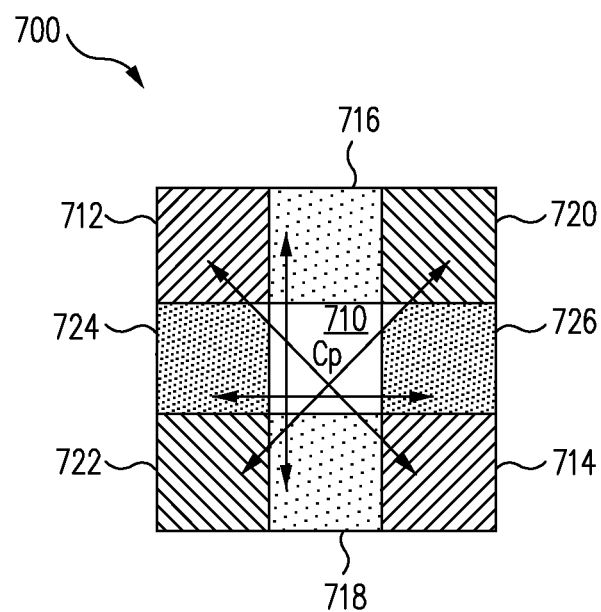
FIG. 7 illustrates a flat field correction technique in accordance with an embodiment of the disclosure.

For example, FIG. 7 illustrates a flat field correction technique 700 in accordance with an embodiment of the disclosure. In FIG. 7, a NUC term may be determined for each pixel 710 of the blurred image frame using the values of its neighboring pixels 712 to 726. For each pixel 710, several gradients may be determined based on the absolute difference between the values of various adjacent pixels. For example, absolute value differences may be determined between: pixels 712 and 714 (a left to right diagonal gradient), pixels 716 and 718 (a top to bottom vertical gradient), pixels 720 and 722 (a right to left diagonal gradient), and pixels 724 and 726 (a left to right horizontal gradient).

These absolute differences may be summed to provide a summed gradient for pixel 710. A weight value may be determined for pixel 710 that is inversely proportional to the summed gradient. This process may be performed for all pixels 710 of the blurred image frame until a weight value is provided for each pixel 710. For areas with low gradients (e.g., areas that are blurry or have low contrast), the weight value will be close to one. Conversely, for areas with high gradients, the weight value will be zero or close to zero. The update to the NUC term as estimated by the high pass filter is multiplied with the weight value.

In one embodiment, the risk of introducing scene information into the NUC terms can be further reduced by applying some amount of temporal damping to the NUC term determination process. For example, a temporal damping factor $\lambda$ between 0 and 1 may be chosen such that the new NUC term ($NUC_{NEW}$) stored is a weighted average of the old NUC term ($NUC_{OLD}$) and the estimated updated NUC term ($NUC_{UPDATE}$). In one embodiment, this can be expressed as $NUC_{NEW}=\lambda \cdot NUC_{OLD}+(1-\lambda)\cdot(NUC_{OLD}+NUC_{UPDATE})$.

Although the determination of NUC terms has been described with regard to gradients, local contrast values may be used instead where appropriate. Other techniques may also be used such as, for example, standard deviation calculations. Other types flat field correction processes may be performed to determine NUC terms including, for example, various processes identified in U.S. Pat. No. 6,028,309 issued Feb. 22, 2000, U.S. Pat. No. 6,812,465 issued Nov. 2, 2004, and U.S. patent application Ser. No. 12/114,865 filed May 5, 2008, which are incorporated herein by reference in their entirety.

Referring again to FIG. 5, block 570 may include additional processing of the NUC terms. For example, in one embodiment, to preserve the scene signal mean, the sum of all NUC terms may be normalized to zero by subtracting the NUC term mean from each NUC term. Also in block 570, to avoid row and column noise from affecting the NUC terms, the mean value of each row and column may be subtracted from the NUC terms for each row and column. As a result, row and column FPN filters using the row and column FPN terms determined in block 550 may be better able to filter out row and column noise in further iterations (e.g., as further shown in FIG. 8) after the NUC terms are applied to captured images (e.g., in block 580 further discussed herein). In this regard, the row and column FPN filters may in general use more data to calculate the per row and per column offset coefficients (e.g., row and column FPN terms) and may thus provide a more robust alternative for reducing spatially correlated FPN than the NUC terms which are based on high pass filtering to capture spatially uncorrelated noise.

In blocks 571-573, additional high pass filtering and further determinations of updated NUC terms may be optionally performed to remove spatially correlated FPN with lower spatial frequency than previously removed by row and column FPN terms. In this regard, some variability in infrared sensors 132 or other components of infrared imaging module 100 may result in spatially correlated FPN noise that cannot be easily modeled as row or column noise. Such spatially correlated FPN may include, for example, window defects on a sensor package or a cluster of infrared sensors 132 that respond differently to irradiance than neighboring infrared sensors 132. In one embodiment, such spatially correlated FPN may be mitigated with an offset correction. If the amount of such spatially correlated FPN is significant, then the noise may also be detectable in the blurred image frame. Since this type of noise may affect a neighborhood of pixels, a high pass filter with a small kernel may not detect the FPN in the neighborhood (e.g., all values used in high pass filter may be taken from the neighborhood of affected pixels and thus may be affected by the same offset error). For example, if the high pass filtering of block 565 is performed with a small kernel (e.g., considering only immediately adjacent pixels that fall within a neighborhood of pixels affected by spatially correlated FPN), then broadly distributed spatially correlated FPN may not be detected.

Figure 11:
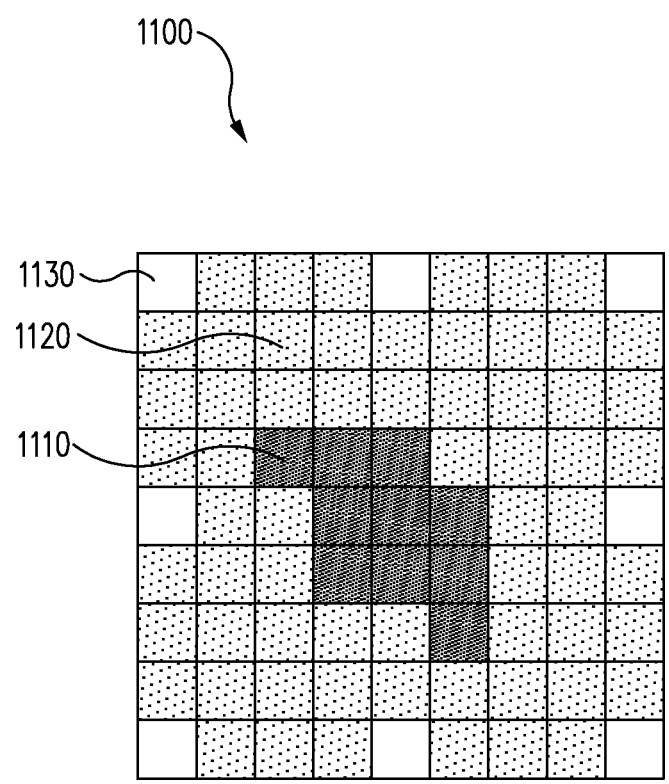
FIG. 11 illustrates spatially correlated FPN in a neighborhood of pixels in accordance with an embodiment of the disclosure.

For example, FIG. 11 illustrates spatially correlated FPN in a neighborhood of pixels in accordance with an embodiment of the disclosure. As shown in a sample image frame 1100, a neighborhood of pixels 1110 may exhibit spatially correlated FPN that is not precisely correlated to individual rows and columns and is distributed over a neighborhood of several pixels (e.g., a neighborhood of approximately 4 by 4 pixels in this example). Sample image frame 1100 also includes a set of pixels 1120 exhibiting substantially uniform response that are not used in filtering calculations, and a set of pixels 1130 that are used to estimate a low pass value for the neighborhood of pixels 1110. In one embodiment, pixels 1130 may be a number of pixels divisible by two in order to facilitate efficient hardware or software calculations.

Referring again to FIG. 5, in blocks 571-573, additional high pass filtering and further determinations of updated NUC terms may be optionally performed to remove spatially correlated FPN such as exhibited by pixels 1110. In block 571, the updated NUC terms determined in block 570 are applied to the blurred image frame. Thus, at this time, the blurred image frame will have been initially corrected for spatially correlated FPN (e.g., by application of the updated row and column FPN terms in block 555), and also initially corrected for spatially uncorrelated FPN (e.g., by application of the updated NUC terms applied in block 571).

In block 572, a further high pass filter is applied with a larger kernel than was used in block 565, and further updated NUC terms may be determined in block 573. For example, to detect the spatially correlated FPN present in pixels 1110, the high pass filter applied in block 572 may include data from a sufficiently large enough neighborhood of pixels such that differences can be determined between unaffected pixels (e.g., pixels 1120) and affected pixels (e.g., pixels 1110). For example, a low pass filter with a large kernel can be used (e.g., an N by N kernel that is much greater than 3 by 3 pixels) and the results may be subtracted to perform appropriate high pass filtering.

In one embodiment, for computational efficiency, a sparse kernel may be used such that only a small number of neighboring pixels inside an N by N neighborhood are used. For any given high pass filter operation using distant neighbors (e.g., a large kernel), there is a risk of modeling actual (potentially blurred) scene information as spatially correlated FPN. Accordingly, in one embodiment, the temporal damping factor $\lambda$ may be set close to 1 for updated NUC terms determined in block 573.

In various embodiments, blocks 571-573 may be repeated (e.g., cascaded) to iteratively perform high pass filtering with increasing kernel sizes to provide further updated NUC terms further correct for spatially correlated FPN of desired neighborhood sizes. In one embodiment, the decision to perform such iterations may be determined by whether spatially correlated FPN has actually been removed by the updated NUC terms of the previous performance of blocks 571-573.

After blocks 571-573 are finished, a decision is made regarding whether to apply the updated NUC terms to captured image frames (block 574). For example, if an average of the absolute value of the NUC terms for the entire image frame is less than a minimum threshold value, or greater than a maximum threshold value, the NUC terms may be deemed spurious or unlikely to provide meaningful correction. Alternatively, thresholding criteria may be applied to individual pixels to determine which pixels receive updated NUC terms. In one embodiment, the threshold values may correspond to differences between the newly calculated NUC terms and previously calculated NUC terms. In another embodiment, the threshold values may be independent of previously calculated NUC terms. Other tests may be applied (e.g., spatial correlation tests) to determine whether the NUC terms should be applied.

If the NUC terms are deemed spurious or unlikely to provide meaningful correction, then the flow diagram returns to block 505. Otherwise, the newly determined NUC terms are stored (block 575) to replace previous NUC terms (e.g., determined by a previously performed iteration of FIG. 5) and applied (block 580) to captured image frames.

Figure 8:
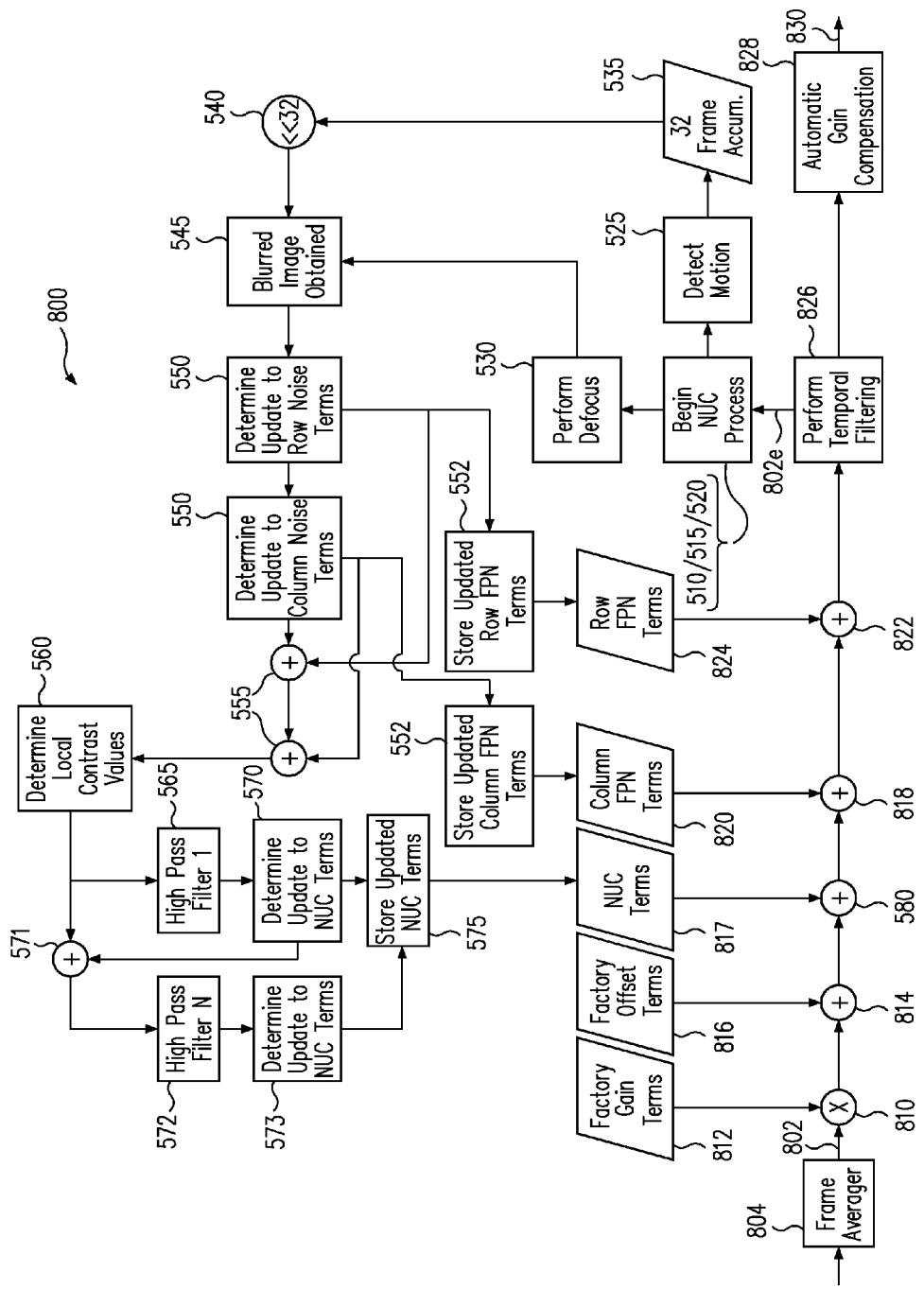
FIG. 8 illustrates various image processing techniques of FIG. 5 and other operations applied in an image processing pipeline in accordance with an embodiment of the disclosure.

FIG. 8 illustrates various image processing techniques of FIG. 5 and other operations applied in an image processing pipeline 800 in accordance with an embodiment of the disclosure. In this regard, pipeline 800 identifies various operations of FIG. 5 in the context of an overall iterative image processing scheme for correcting image frames provided by infrared imaging module 100. In some embodiments, pipeline 800 may be provided by processing module 160 or processor 195 (both also generally referred to as a processor) operating on image frames captured by infrared sensors 132.

Image frames captured by infrared sensors 132 may be provided to a frame averager 804 that integrates multiple image frames to provide image frames 802 with an improved signal to noise ratio. Frame averager 804 may be effectively provided by infrared sensors 132, ROIC 402, and other components of infrared sensor assembly 128 that are implemented to support high image capture rates. For example, in one embodiment, infrared sensor assembly 128 may capture infrared image frames at a frame rate of 240 Hz (e.g., 240 images per second). In this embodiment, such a high frame rate may be implemented, for example, by operating infrared sensor assembly 128 at relatively low voltages (e.g., compatible with mobile telephone voltages) and by using a relatively small array of infrared sensors 132 (e.g., an array of 64 by 64 infrared sensors in one embodiment).

In one embodiment, such infrared image frames may be provided from infrared sensor assembly 128 to processing module 160 at a high frame rate (e.g., 240 Hz or other frame rates). In another embodiment, infrared sensor assembly 128 may integrate over longer time periods, or multiple time periods, to provide integrated (e.g., averaged) infrared image frames to processing module 160 at a lower frame rate (e.g., 30 Hz, 9 Hz, or other frame rates). Further information regarding implementations that may be used to provide high image capture rates may be found in U.S. Provisional Patent Application No. 61/495,879 filed Jun. 10, 2011 which is incorporated herein by reference in its entirety.

Image frames 802 proceed through pipeline 800 where they are adjusted by various terms, temporally filtered, used to determine the various adjustment terms, and gain compensated.

In blocks 810 and 814, factory gain terms 812 and factory offset terms 816 are applied to image frames 802 to compensate for gain and offset differences, respectively, between the various infrared sensors 132 and/or other components of infrared imaging module 100 determined during manufacturing and testing.

In block 580, NUC terms 817 are applied to image frames 802 to correct for FPN as discussed. In one embodiment, if NUC terms 817 have not yet been determined (e.g., before a NUC process has been initiated), then block 580 may not be performed or initialization values may be used for NUC terms 817 that result in no alteration to the image data (e.g., offsets for every pixel would be equal to zero).

In blocks 818 and 822, column FPN terms 820 and row FPN terms 824, respectively, are applied to image frames 802. Column FPN terms 820 and row FPN terms 824 may be determined in accordance with block 550 as discussed. In one embodiment, if the column FPN terms 820 and row FPN terms 824 have not yet been determined (e.g., before a NUC process has been initiated), then blocks 818 and 822 may not be performed or initialization values may be used for the column FPN terms 820 and row FPN terms 824 that result in no alteration to the image data (e.g., offsets for every pixel would be equal to zero).

Figure 9:
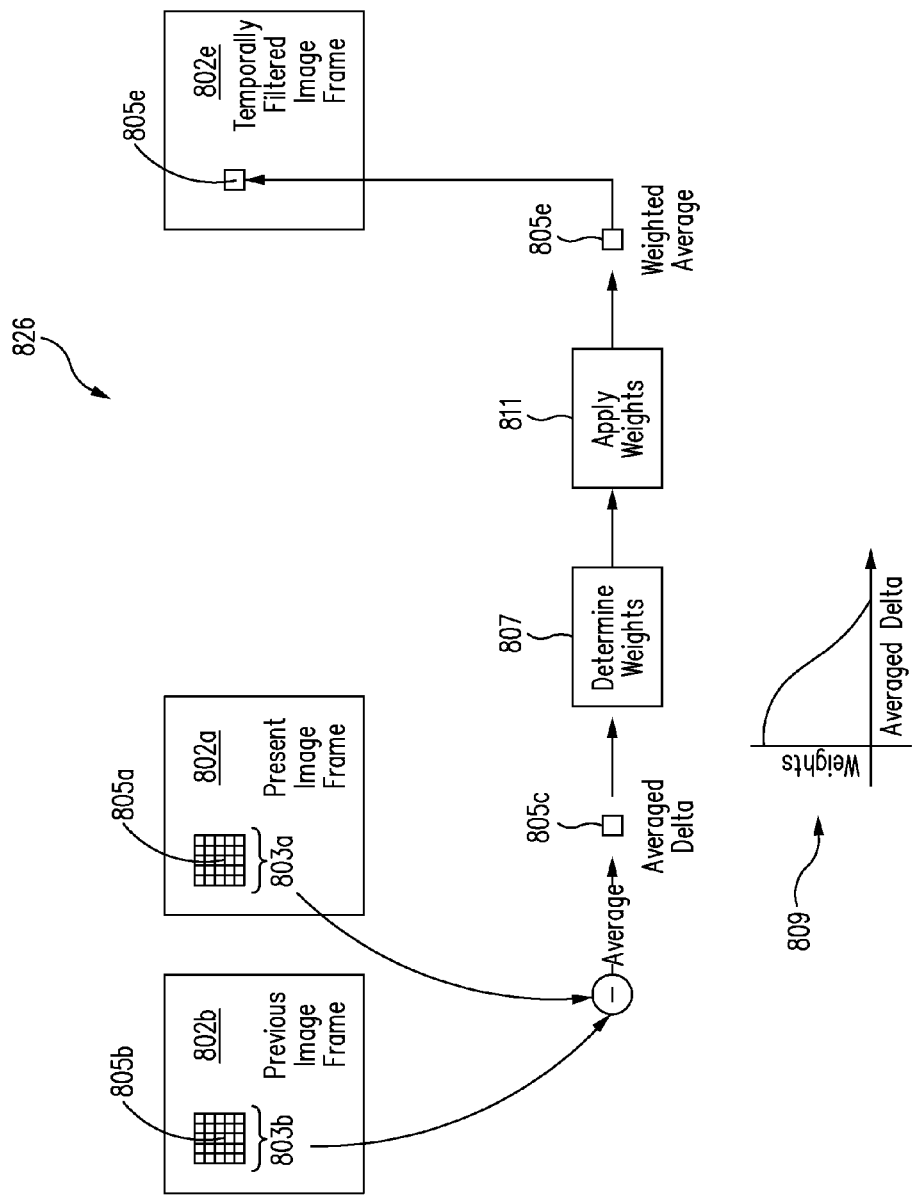
FIG. 9 illustrates a temporal noise reduction process in accordance with an embodiment of the disclosure.

In block 826, temporal filtering is performed on image frames 802 in accordance with a temporal noise reduction (TNR) process. FIG. 9 illustrates a TNR process in accordance with an embodiment of the disclosure. In FIG. 9, a presently received image frame 802a and a previously temporally filtered image frame 802b are processed to determine a new temporally filtered image frame 802e. Image frames 802a and 802b include local neighborhoods of pixels 803a and 803b centered around pixels 805a and 805b, respectively. Neighborhoods 803a and 803b correspond to the same locations within image frames 802a and 802b and are subsets of the total pixels in image frames 802a and 802b. In the illustrated embodiment, neighborhoods 803a and 803b include areas of 5 by 5 pixels. Other neighborhood sizes may be used in other embodiments.

Differences between corresponding pixels of neighborhoods 803a and 803b are determined and averaged to provide an averaged delta value 805c for the location corresponding to pixels 805a and 805b. Averaged delta value 805c may be used to determine weight values in block 807 to be applied to pixels 805a and 805b of image frames 802a and 802b.

In one embodiment, as shown in graph 809, the weight values determined in block 807 may be inversely proportional to averaged delta value 805c such that weight values drop rapidly towards zero when there are large differences between neighborhoods 803a and 803b. In this regard, large differences between neighborhoods 803a and 803b may indicate that changes have occurred within the scene (e.g., due to motion) and pixels 802a and 802b may be appropriately weighted, in one embodiment, to avoid introducing blur across frame-to-frame scene changes. Other associations between weight values and averaged delta value 805c may be used in various embodiments.

The weight values determined in block 807 may be applied to pixels 805a and 805b to determine a value for corresponding pixel 805e of image frame 802e (block 811). In this regard, pixel 805e may have a value that is a weighted average (or other combination) of pixels 805a and 805b, depending on averaged delta value 805c and the weight values determined in block 807.

For example, pixel 805e of temporally filtered image frame 802e may be a weighted sum of pixels 805a and 805b of image frames 802a and 802b. If the average difference between pixels 805a and 805b is due to noise, then it may be expected that the average change between neighborhoods 805a and 805b will be close to zero (e.g., corresponding to the average of uncorrelated changes). Under such circumstances, it may be expected that the sum of the differences between neighborhoods 805a and 805b will be close to zero. In this case, pixel 805a of image frame 802a may both be appropriately weighted so as to contribute to the value of pixel 805e.

However, if the sum of such differences is not zero (e.g., even differing from zero by a small amount in one embodiment), then the changes may be interpreted as being attributed to motion instead of noise. Thus, motion may be detected based on the average change exhibited by neighborhoods 805a and 805b. Under these circumstances, pixel 805a of image frame 802a may be weighted heavily, while pixel 805b of image frame 802b may be weighted lightly.

Other embodiments are also contemplated. For example, although averaged delta value 805c has been described as being determined based on neighborhoods 805a and 805b, in other embodiments averaged delta value 805c may be determined based on any desired criteria (e.g., based on individual pixels or other types of groups of sets of pixels).

In the above embodiments, image frame 802a has been described as a presently received image frame and image frame 802b has been described as a previously temporally filtered image frame. In another embodiment, image frames 802a and 802b may be first and second image frames captured by infrared imaging module 100 that have not been temporally filtered.

Figure 10:
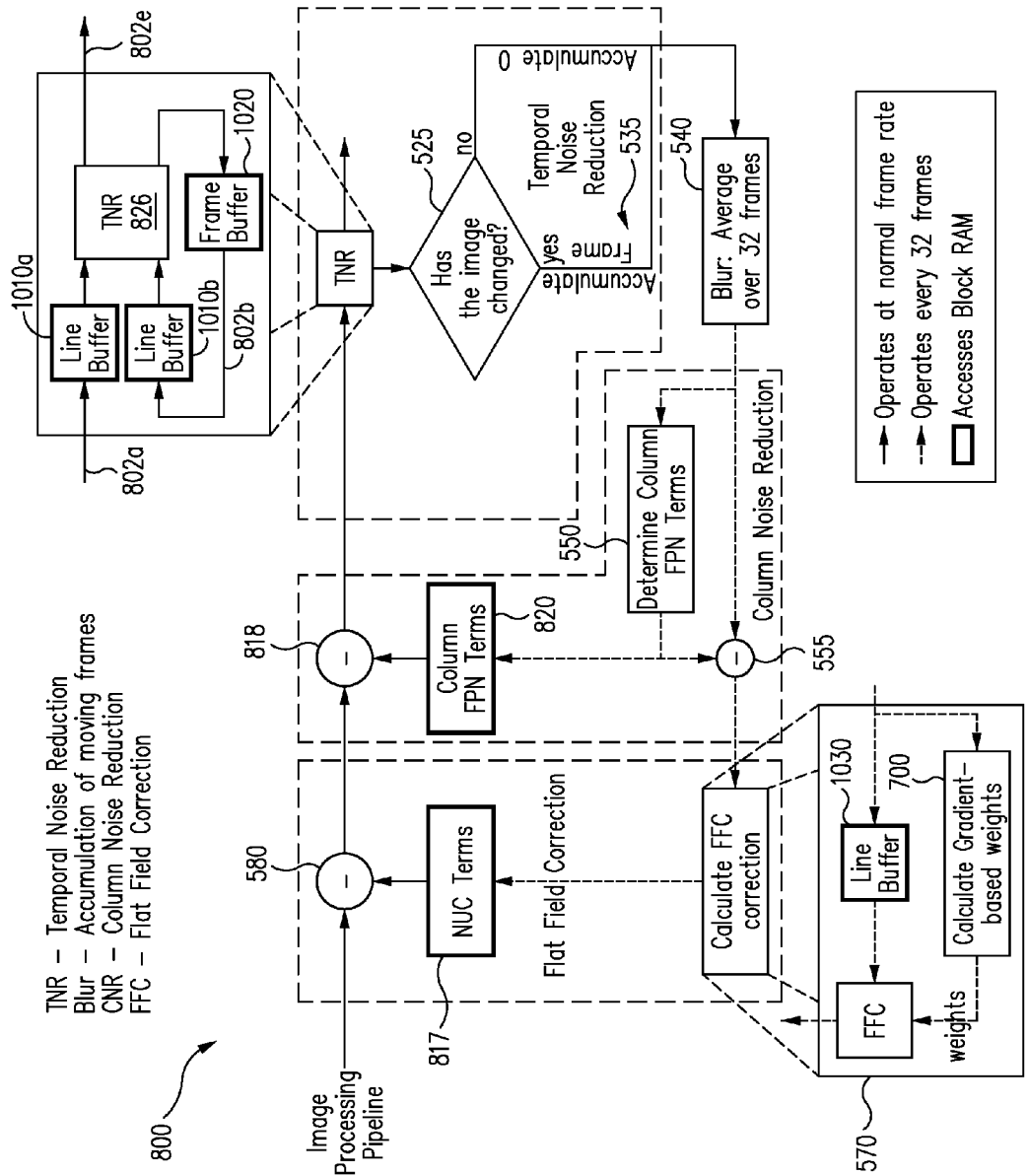
FIG. 10 illustrates particular implementation details of several processes of the image processing pipeline of FIG. 6 in accordance with an embodiment of the disclosure.

FIG. 10 illustrates further implementation details in relation to the TNR process of block 826. As shown in FIG. 10, image frames 802a and 802b may be read into line buffers 1010a and 1010b, respectively, and image frame 802b (e.g., the previous image frame) may be stored in a frame buffer 1020 before being read into line buffer 1010b. In one embodiment, line buffers 1010a-b and frame buffer 1020 may be implemented by a block of random access memory (RAM) provided by any appropriate component of infrared imaging module 100 and/or host device 102.

Referring again to FIG. 8, image frame 802e may be passed to an automatic gain compensation block 828 for further processing to provide a result image frame 830 that may be used by host device 102 as desired.

FIG. 8 further illustrates various operations that may be performed to determine row and column FPN terms and NUC terms as discussed. In one embodiment, these operations may use image frames 802e as shown in FIG. 8. Because image frames 802e have already been temporally filtered, at least some temporal noise may be removed and thus will not inadvertently affect the determination of row and column FPN terms 824 and 820 and NUC terms 817. In another embodiment, non-temporally filtered image frames 802 may be used.

In FIG. 8, blocks 510, 515, and 520 of FIG. 5 are collectively represented together. As discussed, a NUC process may be selectively initiated and performed in response to various NUC process initiating events and based on various criteria or conditions. As also discussed, the NUC process may be performed in accordance with a motion-based approach (blocks 525, 535, and 540) or a defocus-based approach (block 530) to provide a blurred image frame (block 545). FIG. 8 further illustrates various additional blocks 550, 552, 555, 560, 565, 570, 571, 572, 573, and 575 previously discussed with regard to FIG. 5.

As shown in FIG. 8, row and column FPN terms 824 and 820 and NUC terms 817 may be determined and applied in an iterative fashion such that updated terms are determined using image frames 802 to which previous terms have already been applied. As a result, the overall process of FIG. 8 may repeatedly update and apply such terms to continuously reduce the noise in image frames 830 to be used by host device 102.

Referring again to FIG. 10, further implementation details are illustrated for various blocks of FIGS. 5 and 8 in relation to pipeline 800. For example, blocks 525, 535, and 540 are shown as operating at the normal frame rate of image frames 802 received by pipeline 800. In the embodiment shown in FIG. 10, the determination made in block 525 is represented as a decision diamond used to determine whether a given image frame 802 has sufficiently changed such that it may be considered an image frame that will enhance the blur if added to other image frames and is therefore accumulated (block 535 is represented by an arrow in this embodiment) and averaged (block 540).

Also in FIG. 10, the determination of column FPN terms 820 (block 550) is shown as operating at an update rate that in this example is 1/32 of the sensor frame rate (e.g., normal frame rate) due to the averaging performed in block 540. Other update rates may be used in other embodiments. Although only column FPN terms 820 are identified in FIG. 10, row FPN terms 824 may be implemented in a similar fashion at the reduced frame rate.

FIG. 10 also illustrates further implementation details in relation to the NUC determination process of block 570. In this regard, the blurred image frame may be read to a line buffer 1030 (e.g., implemented by a block of RAM provided by any appropriate component of infrared imaging module 100 and/or host device 102). The flat field correction technique 700 of FIG. 7 may be performed on the blurred image frame.

In view of the present disclosure, it will be appreciated that techniques described herein may be used to remove various types of FPN (e.g., including very high amplitude FPN) such as spatially correlated row and column FPN and spatially uncorrelated FPN.

Other embodiments are also contemplated. For example, in one embodiment, the rate at which row and column FPN terms and/or NUC terms are updated can be inversely proportional to the estimated amount of blur in the blurred image frame and/or inversely proportional to the magnitude of local contrast values (e.g., determined in block 560).

In various embodiments, the described techniques may provide advantages over conventional shutter-based noise correction techniques. For example, by using a shutterless process, a shutter (e.g., such as shutter 105) need not be provided, thus permitting reductions in size, weight, cost, and mechanical complexity. Power and maximum voltage supplied to, or generated by, infrared imaging module 100 may also be reduced if a shutter does not need to be mechanically operated. Reliability will be improved by removing the shutter as a potential point of failure. A shutterless process also eliminates potential image interruption caused by the temporary blockage of the imaged scene by a shutter.

Also, by correcting for noise using intentionally blurred image frames captured from a real world scene (not a uniform scene provided by a shutter), noise correction may be performed on image frames that have irradiance levels similar to those of the actual scene desired to be imaged. This can improve the accuracy and effectiveness of noise correction terms determined in accordance with the various described techniques.

Turning now to FIGS. 12-16, smart surveillance camera systems and methods using a thermal imager will now be described. According to various embodiments of the disclosure, a smart surveillance camera system may provide smart illumination and recording of a surveillance scene, by processing and analyzing thermal images of the surveillance scene captured by a thermal imager (e.g., infrared imaging module 100 of FIG. 1). In one embodiment, a smart surveillance camera system may include infrared (IR) illuminators, visible light illuminators, a visible light camera sensitive to visible and reflected near IR (NIR) light (e.g., from objects illuminated by IR illuminators), a thermal imager, and a processor. In one embodiment, the thermal imager and/or the processor may be configured to detect objects of interest (e.g., people, vehicles) in a scene, and control the IR illuminators, the visible light illuminators, and/or the visible/NIR light camera based on the detection.

For example, when an object of interest enters the field of view (FOV), the smart surveillance camera may activate the IR illuminators and/or the visible light illuminators. Such activation may depend on the type and/or other attributes of the object. Thus, these illuminators, which can become hot over time, can be turned on intermittently only when desired or needed.

Such smart illumination may beneficially prevent accumulation of spider webs that adversely affect performance of conventional surveillance cameras, as well as provide other benefits described herein. Various conventional camera systems may require active illuminators to be turned on in low light situations (e.g., during nighttime or in a dimly lit room) constantly and continuously, which attracts insects and causes buildup of spider webs close to cameras, and in turn may trigger the cameras to constantly record meaningless images. In contrast, the smart surveillance camera system may reduce attraction of insects and spider webs in the first place by turning on illuminators intermittently only when needed, and even if spurious objects such as spider webs or insects are present, cameras do not constantly record meaningless images since spurious objects can be detected as such by capturing and analyzing thermal images of the surveillance scene. As such, the smart surveillance camera system may beneficially reduce power consumption by illuminators and cameras, as well as save time and effort wasted in reviewing long clips of meaningless video images.

In various embodiments, the smart surveillance camera system may selectively capture (e.g., to transmit to a local or remote monitoring station) images of the surveillance scene using a visible/NIR light camera, based on the detected presence and/or other attributes of the objects. The smart surveillance camera system may selectively record such images, for example on a local or remote storage device, based on the detection. As described above, various light sources (e.g., visible light illuminators, IR illuminators) may also be selectively operated in response to the detection, illuminating the surveillance scene for the visible/NIR camera, or independent from operations of the visible/NIR camera. As may be appreciated, many useful combinations of smart illumination and recording operations may be provided by the smart surveillance camera system.

In this regard, the smart surveillance camera system may allow users to further define, customize, or otherwise configure smart illumination and recording operations. Users may configure the camera system to perform specific illumination and recording operations according to the types of the detected objects.

For example, in some embodiments, if a person is detected, visible light illuminators are utilized as a spot light that tracks the person while within the FOV, by selectively turning on and off visible light illuminators each oriented for projecting light in a certain direction, or by mechanically adjusting the direction of light output from the visible light illuminators. In another example, if a vehicle or other large object is detected, as many visible light illuminators as desired are turned on to adequately illuminate the object (e.g., create a floodlight). In another example, if an animal or other non-spurious object is detected, IR illuminators are turned on while the object is within the FOV. In another example, if a spurious object (e.g., spider webs, insects, tumble weed, or other objects not of interest for surveillance purposes) is detected, no illuminator is turned on.

In these examples and others, users may configure the camera system to selectively provide images (e.g., visible/NIR light image frames and/or thermal image frames such as video feeds or still images from the visible/NIR light camera and/or thermal imager) for a local recording and/or a remote recording/viewing of the surveillance scene, with or without the activation of the various illuminators. In some embodiments, the camera system may provide users with an option for recording high contrast, high resolution user-viewable thermal images, which may provide useful details even when the images are captured in low light situations (e.g., nighttime surveillance). Such blended thermal images may be generated, in some embodiments, by blending thermal images captured by the thermal imager with NIR images captured by the visible light camera. In such embodiments, users may, for example, set the camera system to turn on the IR illuminators and record blended thermal images that may be useful for determining possible causes (e.g., a person hiding behind a bush) of detected spurious object motions, rather than configuring the camera system to ignore the detected spurious object motions (e.g., by leaving the illuminators and visible light camera off).

In various embodiments, the camera system may further include a communication module for interfacing and communicating with other external devices. The communication module may be configured to support various communication standards and protocols for home networking (e.g., the X10 standard), for surveillance camera networking (e.g., the Open Network Video Interface Forum (ONVIF) standard), for wireless networking (e.g., the IEEE 801.11 WiFI standards, the Bluetooth™ standard, the ZigBee™ standard), for general wired networking (e.g., Ethernet, HomePlug™ specification), and/or for other types of networking. Thus, for example, the camera system may also open gates and garage doors if a car is detected, turn on security lights if an object of interest is detected, record from other surveillance cameras, and/or otherwise control other networked devices based on detection of objects in the surveillance scene.

Figure 12:
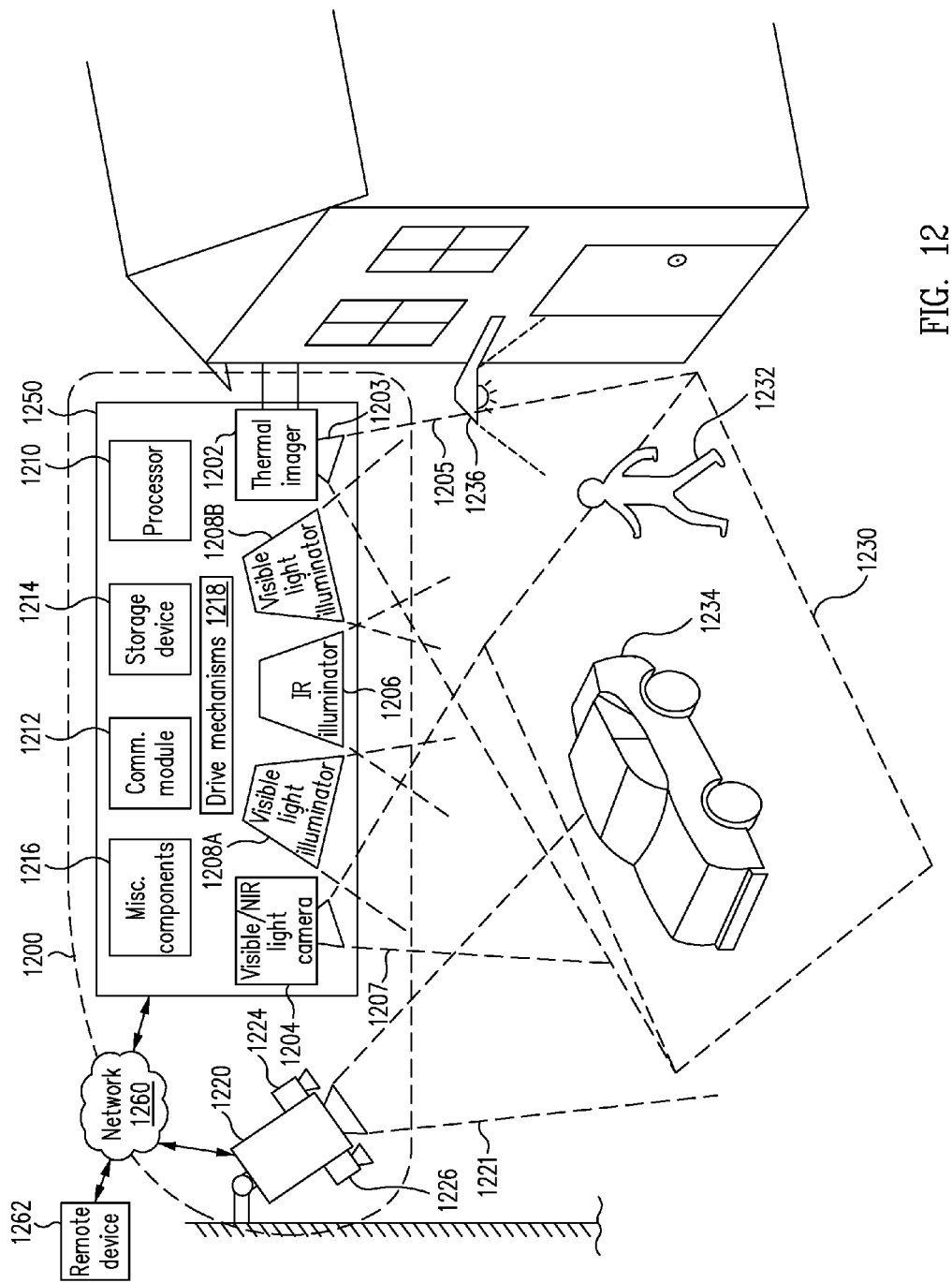
FIG. 12 illustrates a block diagram of a smart surveillance camera system having a thermal imager in accordance with an embodiment of the disclosure.

FIG. 12 shows a block diagram of a smart surveillance camera system 1200 in accordance with an embodiment of the disclosure. Camera system 1200 may include a thermal imager 1202, a visible/NIR light camera 1204, one or more IR illuminators 1206, one or more visible light illuminators 1208A-1208B, a processor 1210, a communication module 1212, a storage device 1214, and/or miscellaneous components 1216. Camera system 1200 may be attached, mounted, or otherwise installed at a desired location to provide surveillance of a scene (e.g., scene 1230), by recording, transmitting for remote viewing/recording, or otherwise providing images of the scene in day or nighttime. In various embodiments, components of camera system 1200 may be implemented in the same or similar manner as corresponding components of host device 102 of FIG. 1. Moreover, components of camera system 1200 may be configured to perform various NUC processes and other processes described herein.

In some embodiments, various components of camera system 1200 may be distributed and in communication with one another over a network 1260. In such embodiments, components may also be replicated if desired for particular applications of camera system 1200. That is, components configured for same or similar operations may be distributed over a network. Further, all or part of any one of the various components may be implemented using appropriate components of a remote device 1262 (e.g., a conventional remote digital video recorder (DVR), remote monitoring station, and/or other device) if desired. Thus, for example, all or part of processor 1210 and/or all of part of storage device 1214 may be implemented or replicated at remote device 1262, and configured to record or control recording of surveillance images as further described herein. In another example, camera system 1200 may comprise another visible/NIR camera 1220 located separately and remotely from a housing 1250 in which thermal imager 1202, visible/NIR camera 1204, and/or processor 1210 may be enclosed. It will be appreciated that many other combinations of distributed implementations of camera system 1200 are possible, without departing from the scope and spirit of the disclosure.

Thermal imager 1202 may be implemented with infrared imaging module 100 of FIG. 1 or other appropriate infrared imaging devices suitable for capturing thermal images. Thermal imager 1202 may include an FPA implemented, for example, in accordance with various embodiments disclosed herein or others where appropriate. Thermal imager 1202 may be configured to capture, process, and/or otherwise manage thermal images of scene 1230. The thermal images captured, processed, and/or otherwise managed by thermal imager 1202 may be radiometrically normalized images. That is, pixels that make up the captured image may contain calibrated thermal data (e.g., temperature). As discussed above in connection with infrared imaging module 100 of FIG. 1, thermal imager 1202 and/or associated components may be calibrated using appropriate techniques so that images captured by thermal imager 1202 are properly calibrated thermal images. In some embodiments, appropriate calibration processes may be performed periodically by thermal imager 1202 and/or processor 1210 so that thermal imager 1202, and hence the thermal images captured by it, may maintain proper calibration.

Radiometric normalization permits thermal imager 1202 and/or processor 1210 to efficiently detect, from thermal images, objects having a specific range of temperature. Thermal imager 1202 and/or processor 1210 may detect such objects efficiently and effectively, because thermal images of objects having a specific temperature may be easily discernable from a background and other objects, and yet less susceptible to lighting conditions or obscuring. In contrast, object detection operations performed on visible light images or non-normalized infrared images (e.g., reflected NIR images captured by CMOS or CCD sensors), such as performing edge detection and/or pattern recognition algorithms on such images, may be computationally complex yet ineffective.

For example, in one embodiment, thermal imager 1202 and/or processor 1210 may be configured to detect from thermal images contiguous regions of pixels (also referred to as "blobs" or "warm blobs") having a temperature approximately in the range of a clothed person, for example, between approximately 75° F. (e.g., clothed part of a body) and approximately 110° F. (e.g., exposed part of a body such as a face and hands). Such "warm blobs" may indicate presence of persons (e.g., person 1232) in scene 1230, and may be analyzed further as described herein to ascertain the presence of one or more persons. Thermal imager 1202 and/or processor 1210 may similarly detect and discern animals, vehicles (e.g., vehicle 1234), or other objects of interest in scene 1230 by detecting and analyzing objects having temperatures typical for objects of interest. Thus, detection of persons, motor vehicles, animals, or other objects of interest in scene 1230 by camera system 1200 may be efficient, yet less susceptible to false detection of spurious objects such as a spider web fluttering in the wind.

In addition, for various embodiments the captured thermal images may be scale and/or perspective calibrated thermal images. That is, geometric properties (e.g., size and position) of objects in the actual scene can be derived from the pixel coordinates of objects in the thermal images. Scale/perspective calibration may be performed manually or automatically using known techniques when camera system 1200 is first installed at a desired location. In some embodiments, automatic recalibration may also be performed using known techniques periodically after installation. Thus, for example, processor 1210 may be configured to determine which illuminators and/or visible/NIR cameras to activate based on the approximate location of objects derived from the thermal images.

In various embodiments, thermal imager 1202 may include one or more optical elements 1203 (e.g., infrared-transmissive lenses, infrared-transmissive prisms, infrared-reflective mirrors, infrared fiber optics, and/or other elements) for suitably collecting and routing infrared light from scene 1230 to an FFA of thermal imager 1202. Optical elements 1203 may also define an FOV 1205 of thermal imager 1202. In one example, FOV 1205 may be wide such that scene 1230 covers a larger area than what may be covered by an FOV 1207 of visible/NIR camera 1204 or an illumination area of illuminators 1206, 1208A-1208B respectively. It is contemplated that any desired wide and/or narrow FOVs 1205 and 1207 may be used, and that FOVs 1205 and 1207 may overlap to any desired extent. For example, FOVs 1205 and 1207 may each be wider or narrower than each other or substantially the same size, and may partially, substantially, or completely overlap with each other.

In these and other examples, thermal images of scene 1230 may be analyzed to activate and/or control one or more other visible/NIR cameras having FOVs that cover areas in scene 1230 not covered by FOV 1207 of visible/NIR camera 1204. For example, camera system 1200 may detect that vehicle 1234 in scene 1230 is moving out FOV 1207 of visible/NIR camera 1204 and entering an FOV 1221 of remote visible/NIR camera 1220. In such a case, camera system 1200 may turn off and/or stop recording from visible/NIR camera 1204 and turn on and/or start recording from remote visible/NIR camera 1220. In various embodiments, camera system 1200 may include any number of local (e.g., co-located with thermal imager) and remote cameras as desired for particular applications, and may be configured to perform, using any number of such local and remote cameras, intelligent control of capturing and/or recording operations described above and elsewhere in the disclosure.

In other embodiments, optical elements 1203 may optionally provide a switchable FOV (e.g., a zoom lens), which may be selectable by thermal imager 1202 and/or processor 1210. Also, thermal imager 1202, visible/NIR light camera 1204, and/or camera system housing 1250 may optionally include appropriate drive mechanisms 1218 (e.g., actuators, motors, and/or other appropriate mechanisms or devices) that provide panning and tilting capabilities to camera system 1200. That is, in some embodiments, camera system 1200 may optionally provide pan-tilt-zoom capabilities, generally known in the art as PTZ capabilities.

Visible/NIR light camera 1204 may be implemented with a conventional image sensor suitable for capturing visible and NIR light images. For example, conventional charge-coupled device (CCD) sensors and complementary metal-oxide semiconductor (CMOS) sensors are typically sensitive to light in the NIR spectrum (e.g., 0.7-1.0 µm wavelengths) as well as the visible light spectrum. As such, these conventional image sensors may be capable of capturing images of reflected NIR light in low visible light situations if active IR illumination is available.

Visible/NIR light camera 1204 (and visible/NIR light camera 1220 further discussed herein) may be configured to capture visible images, NIR images, short wave infrared images, and/or images in other non-thermal wavebands of at least a portion of scene 1230. Thus, although visible/NIR light cameras 1204 and 1220 are generally discussed in relation to visible and NIR images, any of the various operations described herein relating to visible/NIR light cameras 1204 and 1220 may be performed using non-thermal images in any desired waveband. Visible/NIR light camera 1204 may be turned on or otherwise activated to capture visible and/or NIR light images based on detection of objects in scene 1230, and in some embodiments, based further on user-defined parameters. For example, visible/NIR light camera 1204 may be turned on or otherwise activated when an object of interest (e.g., person 1232, vehicle 1234) is present within or expected to enter FOV 1207 of visible visible/NIR light camera 1204, based on analysis of thermal images of scene 1230 captured by thermal imager 1202 as further described herein. In this regard, visible/NIR light camera 1204 may be co-located with thermal imager 1202 and oriented for placing at least a portion of FOV 1207 within scene 1230 covered by thermal imager 1202.

Further, camera system 1200 may include any number of visible/NIR light cameras 1204 as desired, for example, to cover a wide surveillance area. As discussed, in some embodiments, one or more visible/NIR light cameras 1220 may be located separately and remotely from thermal imager 1202, in addition to or in place of visible/NIR light camera 1204. Visible/NIR light camera 1220 may be enclosed in its own housing, and may include its own IR illuminators 1224 and visible light illuminators 1226. In other aspects, visible/NIR light camera 1220 may be implemented in a similar manner as visible/NIR light camera 1204.

In some embodiments, visible/NIR light camera 1204/1220 may use active illumination of visible light (e.g., provided by visible light illuminators 1208A-1208B/1226) and/or IR light (e.g., provided by IR illuminators 1206/1224) to capture useable images in low light situations such as nighttime surveillance. In various embodiments, camera system 1200 may determine (e.g., at processor 1210) whether active illumination may be needed due to inadequate ambient light. For example, a need for active illumination may be determined based on an indication from visible/NIR light camera 1204/1220, which may be configured to sense, using conventional techniques in digital imaging, whether an adequate amount of light is available for capturing useable images. In another example, an indication of inadequate ambient light may be generated by a separate photocell that detects the amount of ambient light. In yet another example, other parameters, such as the time of day, may be considered in determining a need for active illumination.

In various embodiments, visible/NIR light camera 1204/1220 may be sensitive to a spectrum that includes at least a first portion (e.g., NIR light) and a second portion (e.g., visible light), each of which may be actively illuminated in a selective manner. For example, active illumination may be provided over a NIR light portion of the spectrum (e.g., NIR light provided by IR illuminators 1206/1224), while no active illumination is provided over a visible light portion of the spectrum. In another example, active illumination may be provided over a visible light portion of the spectrum (e.g., visible light provided by visible light illuminators 1208A-1208B/1226), while no active illumination is provided over a NIR light portion of the spectrum. In another example, active illumination may be provided over both a NIR light portion and a visible light portion of the spectrum. In yet another example, no active illumination may be provided.

As discussed, visible/NIR light camera 1204/1220 may be sensitive to both NIR light and visible light. Accordingly, visible/NIR light camera 1204/1220 may capture images in response to both NIR light and visible light. As such, the spectrum of light represented in or otherwise associated with images captured by visible/NIR light camera 1204/1220 may correspond to NIR light and/or visible light, each of which may be actively illuminated in a selective manner to improve and/or enhance a desired portion of the spectrum represented in or otherwise associated with the captured images.

In some embodiments, visible/NIR light camera 1204/1220 may include an IR filter, which may be selectively moved into an appropriate place in the light path (e.g., in front of the image sensor) to block IR light for improved color and contrast in daytime image capture. For example, the IR filter may be attached to actuators adapted to clear the IR filter from the light path in response to control signals from visible/NIR light camera 1204/1220 and/or processor 1210, which may generate control signals to clear the IR filter when IR illuminators 1206/1224 are activated for active IR illumination in low light situations.

IR illuminators 1206/1224 may be implemented with appropriate light sources or light emitters that produce IR light, including IR light in the NIR spectrum. In one embodiment, IR illuminators 1206/1224 may be implemented using vertical-cavity surface-emitting lasers (VCSELs), which may offer higher efficiency, higher reliability, and a more focused emission spectrum compared with other technologies for IR light generation. As it may be appreciated, implementing IR illuminators using VCSELs may reduce power requirements of camera system 1200, which in turn may permit all or portions of camera system 1200 to be powered by battery and/or solar panels. In other embodiments, IR illuminators 1206/1224 may be implemented with light-emitting diodes (LEDs), halogen IR lamps, or other conventional IR light sources.

In various embodiments, IR illuminators 1206/1224 may be turned on or otherwise activated to illuminate at least a portion of a surveillance scene (e.g., scene 1230) with IR light, in response to control signals from thermal imager 1202 and/or processor 1210. Thermal imager 1202 and/or processor 1210 may activate IR illuminators 1206/1224 in response to the detection of an object of interest in scene 1230, and in some embodiments, based on user-defined parameters as discussed herein. For example, IR illuminators 1206/1224 may be activated in connection with activation of visible/NIR light camera 1204/1220, when it is determined that there is an inadequate amount of ambient light. In this regard, camera system 1200 may include any number of IR illuminators 1206/1224 as desired or needed to provide adequate IR illumination of scene 1230. It will be appreciated that by activating IR illuminators 1206/1224 instead of visible light illuminators 1208A-1208B/1226, surveillance images may be captured and/or recorded surreptitiously without alerting surveillance targets (e.g., people or animals), since people and most animals typically cannot detect IR light.

Visible light illuminators 1208A-1208B/1226 may be implemented with any suitable visible light source or light emitting device. In one embodiment, LED lights may be utilized to implement visible light illuminators 1208A-1208B/1226. In other embodiments, other light sources, such as incandescent lamps, electroluminescent lamps, fluorescent lamps, and electrodeless lamps, may be utilized to implement visible light illuminators 1208A-1208B/1226.

In some embodiments, each of a plurality of the visible light illuminators may be oriented to project visible light in a certain direction, such that when visible light illuminators are turned on and off in a certain sequence, the resulting light beams creates a moving spotlight. For example, visible light illuminator 1208B may be extinguished or dimmed gradually while visible light illuminator 1208A may reciprocally be turned on or brightened gradually as person 1232 moves across scene 1230, thereby creating a spotlight that tracks the movement of person 1232. In this regard, camera system 1200 may include as many visible light illuminators as desired to create a spotlight that tracks smoothly across scene 1230 in any direction. All or a large portion of such visible light illuminators may be turned on to create a floodlight, instead of a spotlight when, for example, there is a need to illuminate a large area. In another example, any number of such visible light illuminators may be turned on or off to increase or decrease illumination area as desired for creating a spotlight, a floodlight, or any size illumination area in between, based on the size or the type of the object in the scene.

In other embodiments, visible light illuminators 1208A-1208B/1226 may include drive mechanisms 1218 (e.g., actuators, motors) configured to pan, tilt, or otherwise change the direction of visible light illuminators 1208A-1208B/1226. In such embodiments, drive mechanisms 1218 may be utilized to create a moving spotlight. In various embodiments, camera system 1200 may include as many such visible light illuminators as desired for increasing total light output and/or illumination area. All or a large portion of such visible light illuminators may be turned on to create a floodlight, instead of a spotlight when, for example, there is a need to illuminate a large area. In another example, any number of such visible light illuminators may be turned on as desired to create an illumination area based on the size or the type of the object in the scene. In some embodiments, visible light illuminators 1208A-1208B/1226 may provide an adjustable beam angle (i.e., diameter or width of a light beam), for example, using adjustable reflectors, to increase or decrease illumination area as desired for creating a spotlight, a floodlight, or any size illumination area in between.

Visible light illuminators 1208A-1208B/1226 may be activated in a floodlight mode, a tracking spotlight mode, or other desired lighting modes, in response to control signals from thermal imager 1202 and/or processor 1210. Thermal imager 1202 and/or processor 1210 may activate and/or control the operation of visible light illuminators 1208A-1208B/1226 according to detection of an object of interest in scene 1230, and in some embodiments, further according to user-defined parameters as discussed herein. For example, visible light illuminators 1208A-1208B/1226 may be activated to provide active illumination for capturing surveillance images with visible/NIR light camera 1204, to light an area for safety of drivers, pedestrians, or other persons, and/or to deter unscrupulous trespassers with a floodlight that turns on or a spotlight that tracks them.

Processor 1210 may be implemented as any appropriate processing device as described with regard to processor 195 in FIG. 1. In some embodiments, at least some part or some operations of processor 1210 described herein may be implemented as part of thermal imager 1202, for example, at processing module 160 described above in connection with FIG. 1. Processor 1210 may be adapted to interface and communicate with other components of camera system 1200 to perform operations and processes described herein.

Processor 1210 may be configured to receive thermal images of a surveillance scene (e.g., scene 1230) captured by thermal imager 1202. Processor 1210 may be configured to detect an object of interest (e.g., person 1232, vehicle 1234) in the surveillance scene and determine the types (e.g., a person, a vehicle, an animal, and/or other non-spurious objects) of the detected objects, by processing and analyzing the received thermal images and the radiometric data contained therein, as further described in the disclosure. In some embodiments, processor 1210 may be further configured to determine other attributes associated with the detected objects, such as a position, a motion vector (i.e., speed and direction of movement), and a size.

In various embodiments, processor 1210 may be configured to generate control signals to activate/deactivate or otherwise control operation of IR illuminators 1206/1224, visible light illuminators 1210A-1210B/1226, and/or visible/NIR light camera 1204/1220, based on the detection and determination of the presence, type, and/or other attributes of objects of interest in the surveillance scene. In some embodiments, the control signals may be generated based further on user-defined parameters, which may specify, for example, various illumination and recording operations of the surveillance scene according to the type and/or other attributes of the detected objects.

For example, as a default setting, if the detected object is determined to be a person, processor 1210 may control visible light illuminators 1210A-1210B/1226 to track the person in a spotlight mode and optionally record images of at least a portion of the scene with an appropriate one of visible/NIR light cameras 1204/1220 (e.g., turn on and/or record when the person is within the FOV and turn off and/or stop recording when the person leaves the FOV) based on the position and/or motion vector associated with the person. If the detected object is a vehicle or other large objects, processor 1210 may control visible light illuminators 1210A-1210B/1226 to illuminate the scene in a floodlight mode while the object is in the scene and optionally record images of the scene with appropriate visible/NIR light cameras 1204/1220 based on the position and/or motion vector associated with the object. If the detected object is an animal or other non-spurious objects to be monitored surreptitiously, processor 1210 may control IR illuminators 1206/1224 to turn on while the object is in the scene and record visible/NIR, thermal, or blended images of the scene with an appropriate ones of visible/NIR light cameras 1204/1220 and thermal imager 1202 based on the position and/or motion vector associated with the object. If the detected object is a spurious object (e.g., spider webs, insects, tumble weed, or other objects not of interest for surveillance purposes), processor 1210 may leave the illuminators and cameras off. In one embodiment, processor 1210 may control visible light illuminators 1210A-1210B/1226 to change the size of the beam angle (e.g., beam width, beam diameter) based on the size or the type of the detected object.

Various other associations between a detected object type and corresponding illumination/monitoring operations may be implemented. In some embodiments, processor 1210 may be further configured to allow users to define such associations. For example, in some circumstances, it may be preferable to turn on IR illuminators 1206/1224 rather than visible light illuminators 1210A-1210B/1226, so that people can be monitored without drawing their attention. In another example, rather than ignoring spurious objects (e.g., including objects that could not be classified), it may be preferable to record thermal images or blended (e.g., high contrast, high resolution thermal images generated by thermal images with NIR or visible light images) images of the scene so that the images may be reviewed for possible causes of detected spurious object motions (e.g., a person hiding behind a bush). In yet another example, if more than one person or object is detected, it may be preferable in some circumstances to track with a spotlight and/or record each person or object separately and individually. Users may define, customize, or otherwise configure these and other desired associations between triggering object type and corresponding illumination/monitoring operations, as well as other user-definable parameters such as the time of day for activating certain illumination/monitoring operations. Such associations, definitions, customizations, or configurations may all be referred herein as user-defined parameters. The user-defined parameters may be stored in memory (e.g., in storage device 1214).

In some embodiments, processor 1210 may be configured to generate user-viewable thermal images (e.g., thermograms) of a surveillance scene (e.g., scene 1230) captured by thermal imager 1202. Processor 1210 may be configured to convert the thermal images using appropriate methods and algorithms. In one embodiment, the radiometric data (e.g., temperature data) contained in the pixels of the thermal images may be converted into gray-scaled or color-scaled pixels to construct images that can be viewed by a person. User-viewable thermal images may optionally include a legend or scale that indicates the approximate temperature of corresponding pixel color and/or intensity. In another embodiment, processor 1210 may be configured to blend, superimpose, fuse, or otherwise combine the thermal images and visible/NIR light images (e.g., captured by visible/NIR light camera 1204/1220) to generate user-viewable images having a higher definition and/or clarity. For example, processor 1210 may be configured to perform a resolution and contrast enhancing fusion operation disclosed in U.S. patent application Ser. No. 13/105,765, filed May 11, 2011, which is incorporated herein by reference in its entirety. In very low light situations or complete darkness, such thermal or blended images may provide more useful information than actively illuminated NIR images.

In some embodiments, processor 1210 may generate control signals to activate/deactivate or otherwise control operation of external devices. For example, processor 1210 may be configured to generate a control signal to operate a gate or a garage door based on a detection of a vehicle and a determination of the position and/or motion vector of the vehicle. In another example, a security light 1236, a streetlight, or other similar lights and lamps in or near the surveillance scene may be controlled by processor 1210. In such embodiments, user-defined parameters may further include user-defined associations between the detected object type and operations of external devices.

In this regard, communication module 1212 may be configured to handle, manage, or otherwise facilitate wired and/or wireless communication between camera system 1200 and an external device, as well as between various components of camera system 1200. For example, through communication module 1212, processor 1210 may transmit control signals to remote visible/NIR light camera 1220, an external surveillance camera system, a garage door opener, a security light, or other remotely located components of camera system 1200 or external devices.

In various embodiments, to handle, manage, or otherwise facilitate communication between camera system 1200 and an external device, communication module 1212 may support various interfaces, protocols, and standards for home and building automation networking, such as the X10 standard, the Building Automation and Control Networks (BACNet) protocol, the S-Bus protocol, the C-bus protocol, the CEBus protocol, the ONE-NET standard, and/or others.

Control signals to devices may be transmitted from communication module 1212 directly to devices using such standards, or may be transmitted to a central controller (e.g., a conventional building control panel for building/home automation) that relays and distributes the control signals to various devices under its control. For example, via communication module 1212, processor 1210 may transmit commands to a building access control (e.g., for opening, closing, locking, unlocking doors and gates) and/or to a building lighting control.

In various embodiments, communication module 1212 may be further configured to support various interfaces, protocols, and standards for surveillance cameras and systems, such as the ONVIF standard and/or others. Thus, for example, camera system 1200 may control other ONVIF-compliant external cameras via communication module 1212, transmit captured or recorded images to an ONVIF-compliant central monitoring station, transmit object detection information or other data generated by processor 1210, and/or receive commands and configurations (e.g., user-defined parameters) from an ONVIF-compliant computer.

In various embodiments, communication module 1212 may be further configured to more general wireless and/or wired networking interfaces, protocols, and standards. In one embodiment, communication module 1212 may include a wireless communication component (e.g., based on the IEEE 802.11 WiFi standards, the Bluetooth™ standard, the ZigBee™ standard, or other appropriate short range wireless communication standards), a wireless broadband component (e.g., based on WiMax technologies), mobile cellular component, a wireless satellite component, or other appropriate wireless communication components. Communication module 1212 may include an antenna coupled thereto for wireless communication purposes. In one embodiment, communication module 1212 may be configured to interface with a wired network via a wired communication component such as a power-line modem (e.g., supporting HomePlug™ standard), a Digital Subscriber Line (DSL) modem, a Public Switched Telephone Network (PSTN) modem, an Ethernet interface, a cable modem, and/or other appropriate components for wired communication. In some embodiments, communication module 1211 may be configured for a proprietary wired communication protocols and interface, and/or for a proprietary wireless communication protocol and interface based on radio frequency (RF), microwave frequency (MWF), infrared frequency (IRF), and/or other appropriate wireless transmission technologies.

Thus, for example, via wired or wireless connection, camera system 1200 may control various external devices, transmit captured or recorded images to an external monitoring and/or recorder device, transmit object detection information or other data generated by processor 1210, and/or receive commands and configurations (e.g., user-defined parameters) from an external computer.

In various embodiments, camera system 1200 may comprise as many such communication modules 1212 as desired for various applications of camera monitoring system 1200. In other embodiments, communication module 1212 may be integrated into or implemented as part of various other components of camera system 1200. For example, thermal imager 1202, processor 1210, and remote visible/NIR light camera 1220 may each comprise a subcomponent that may be configured to perform the operations of communication module 1212, and may communicate via wired and/or wireless connection without separate communication module 1212.

Storage device 1214 may include one or more memory devices or electro-mechanical storage devices and associated logic (e.g., implemented in hardware, software, or a combination of both) for storing and accessing data and information in the one or more memory or electro-mechanical storage devices. The one or more memory or electro-mechanical storage devices may include various types of volatile and non-volatile memories and storages, such as a hard disk drive, a flash memory, a RAM (Random Access Memory), an EEPROM (Electrically-Erasable Read-Only Memory), and other devices for storing digital information.

In various embodiments, storage device 1214 may be configured to store and access images captured by the various cameras and imagers of camera system 1200. In one embodiment, at least a part of storage device 1214 may be implemented with a conventional DVR for storing and accessing video image data. Thus, for example, storage device 1214 may be configured to communicate, directly or via communication module 1212, with visible/NIR light cameras 1204/1220 and/or processor 1210 to receive various raw and/or processed images of the surveillance scene, and record such images. For example, storage device 1214 may be utilized to record visible/NIR light images of the surveillance scene captured by visible/NIR light cameras 1204/1220, user-viewable thermal images converted by processor 1210 from thermal images captured by thermal imager 1202, and/or blended thermal and NIR images generated by processor 1210. In this regard, storage device 1212 and/or processor 1210 may be configured to compress and/or convert images into appropriate format such as the various moving picture experts group (MPEG) format. In some embodiments, storage device 1214 may be implemented locally with thermal imager 1202 and/or various components of camera system 1200. In other embodiments, storage device 1214 may be implemented remotely and in communication with various components of system 1200 (e.g., over network 1260 via communication module 1212, or otherwise). Mixed local and remote implementations are also contemplated.

In various embodiments, storage device 1214 may be utilized to store other data and information generated and/or used by camera system 1200. For example, in some embodiments, processor 1210 may be configured to execute software instructions stored on storage device 1214 and/or on a machine readable medium 193 (see FIG. 1) to perform all or part of various methods, processes, or operations described herein. In another example, the user-defined parameters may also be stored in storage device.

Miscellaneous components 1216 may include any other device or component as may be desired for various application of camera system 1200. In some embodiments, miscellaneous components 1216 may include a global positioning system (GPS) receiver and/or an electronic compass. GPS receiver and/or electronic compass 1216 may be implemented with an appropriate chipset or electronics module adapted for integration into small electronic devices to provide GPS receiver operations, electronic compass operations, or both. GPS receiver and/or the electronic compass may be utilized to automatically obtain geopositional information relating to the installed location of camera system 1200. The geopositional information may be used by processor 1210 and/or communication module 1212 to automatically construct positional mapping information, using appropriate techniques known in the art of computer networking, for location-aware communication among multiple instances of camera system 1200, other surveillance cameras and systems, and other external devices.

In some embodiments, miscellaneous components 1216 may include a photocell for detecting the amount of ambient light. Such a photocell may be used to determine whether or not active illumination may be needed, as discussed above in connection with Visible/NIR light camera 1204/1220.

In some embodiments, miscellaneous components 1216 may include a warning light (e.g., a strobe light, a flashing light), a chime, a speaker with associated circuitry for generating a tone, or other appropriate devices that may be used to generate an audible and/or visible alarm. Such devices may be used to alert, for example, an occupant of a premise that an unusual event (e.g., a trespasser is detected) has occurred.

In some embodiments, miscellaneous components 1216 may include a portable power source such as a battery or a solar panel. Together with communication module 1212 configured for wireless communication, the portable power source may permit camera system 1200 to be conveniently installed at various locations for surveillance, including locations where power lines and/or network cables cannot easily reach. As discussed herein, camera system 1200 may permit power savings that may make the portable power source a meaningful alternative to wired power sources.

In various embodiments, one or more components of camera system 1200 may be combined and/or implemented or not, as desired or depending on application requirements. For example, processor 1210 may be combined with thermal imager 1202, communication module 1212, and/or storage device 1214. In another example, processor 1210 may be combined with thermal imager 1202 with only certain operations of processor 1210 performed by circuitry (e.g., processor, logic device, microprocessor, or microcontroller) within thermal imager 1202. In another example, processor 1210 and/or storage device 1214 may be implemented using appropriate components of a conventional DVR device, which may be located remote from or co-located with other components of camera system 1200 as desired for various applications of camera system 1200.

Therefore, various embodiments of smart surveillance camera system 1200 may provide intelligent illumination and recording of a surveillance scene, by processing and analyzing thermal images of the surveillance scene captured by thermal imager 1202. Various embodiments of camera system 1200 may intelligently control various active illuminators (e.g., IR illuminators 1206/1224, visible light illuminators 1210A-1210B/1226), cameras (e.g., visible/NIR light camera 1204/1220), and external devices according to the type and/or other attributes of the detected objects. Various embodiments of camera system 1200 may also permit users to further define, customize, configure various intelligent illumination/monitoring operations according to the type and/or other attributes of the detected objects.

In addition, camera system 1200 may reduce attraction of insects and spider webs by turning on illuminators intermittently only when needed, and even if spurious objects such as spider webs or insects are present, cameras do not constantly record meaningless images since spurious objects can be detected as such by capturing and analyzing thermal images of the surveillance scene. As such, camera system 1200 may beneficially reduce power consumption by illuminators and cameras, as well as save time and effort wasted in reviewing long clips of meaningless video images.

Figure 13:
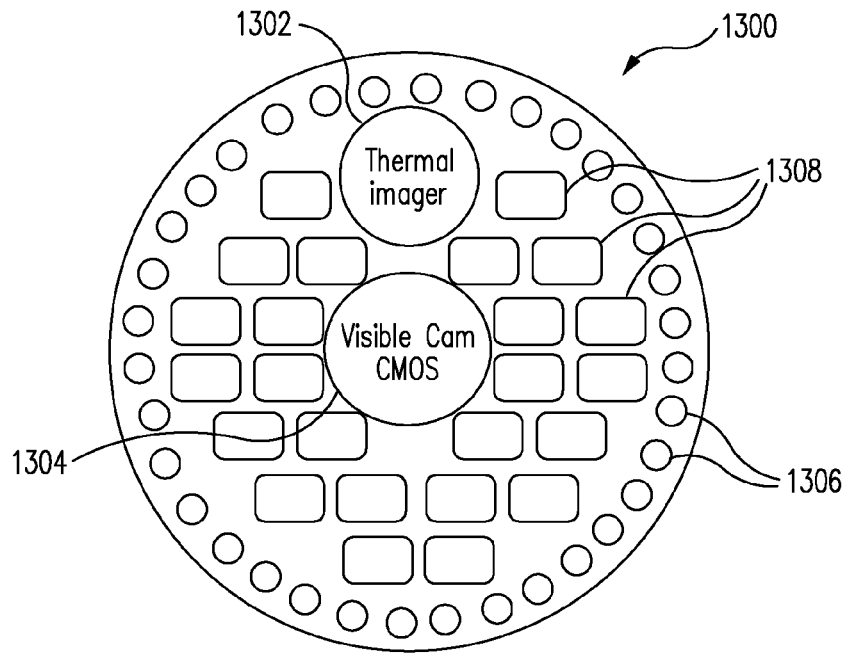
FIG. 13 illustrates a front view of a smart surveillance camera system having a thermal imager in accordance with an embodiment of the disclosure.

FIG. 13 shows a front view of a smart surveillance camera system 1300 implemented in accordance with an embodiment of the disclosure. Components of camera system 1300 may be implemented in the same or similar manner as the corresponding components of camera system 1200. As this example shows, camera system 1300 may include a plurality of IR illuminators 1306, disposed along a front edge thereof and aligned in a circular form. Such alignment of IR illuminators 1306 may permit a large number of IR illuminators to be placed on the front side surface of camera system 1300 and also create a large illumination area. IR illuminators 1306 may be implemented with VCSELs, which may provide higher energy efficiency compared with other types of IR light sources.

Visible light illuminators 1308 in this embodiment may include a large number of LED lights disposed throughout the front side surface of camera system 1300 except where a thermal imager 1302, a CMOS-based visible/NIR light camera 1304, and IR illuminators 1306 are located. Visible light illuminators 1308 may be aligned to direct beams of light in specific directions, such that a moving spotlight may be created by selectively turning on, turning off, dimming, or brightening visible light illuminators 1308. Each one of visible light illuminators 1308 may be aligned in a direction that is distinct from one another, or alternatively, two or more of visible light illuminators 1308 may be aligned in a same direction as a group. Similarly, a moving spotlight may be created by selectively turning on, turning off, dimming, or brightening each one of visible light illuminators 1308 individually or as a group. All or most of the plurality of visible light illuminators 1308 may be turned on (e.g., when a control signal to operate in a floodlight mode is received from a processor and/or thermal imager 1302) to create a floodlight that may cover a large illumination area.

Figure 14:
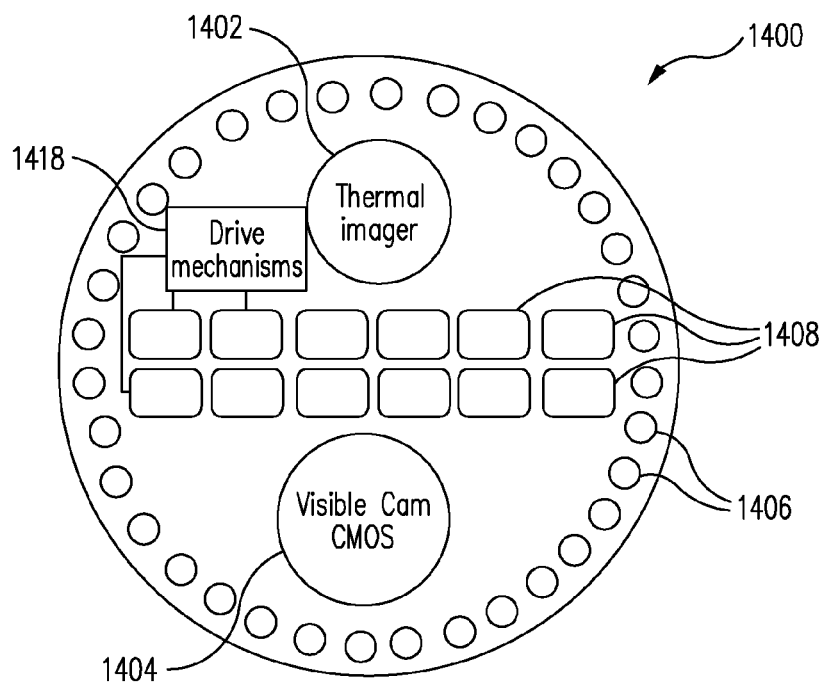
FIG. 14 illustrates a front view of a smart surveillance camera system having a thermal imager in accordance with another embodiment of the disclosure.

FIG. 14 shows a front view of a smart surveillance camera system 1400 implemented in accordance with another embodiment of the disclosure. Components of camera system 1400 may be implemented in the same or similar manner as the corresponding components of camera system 1200/1300. Camera system 1400 may include thermal imager 1402, CMOS-based visible/NIR light camera 1404, a plurality of VCSEL-based IR illuminators 1406, and a plurality of LED-based visible light illuminators 1408, all of which may be disposed on the front side surface similar to camera system 1300. However, in this embodiment, visible light illuminators 1408 may be smaller in number compared with visible light illuminators 1308, and may be positioned in a central region of the front side surface of camera system 1400. Further, rather than being fixed in direction, visible light illuminators 1408 may include drive mechanisms 1418 (e.g., motors, actuators) that pan, tilt, or otherwise change the orientation of one or more (e.g., some, substantially all, or all) of visible light illuminators 1408. Thus, in this embodiment, a tracking spotlight may be created using drive mechanisms 1418. Visible light illuminators 1408 may also provide an adjustable beam angle (i.e., diameter or width of a light beam), for example, using adjustable reflectors, to increase or decrease illumination area as desired for alternating between a spotlight and a floodlight.

Figure 15:
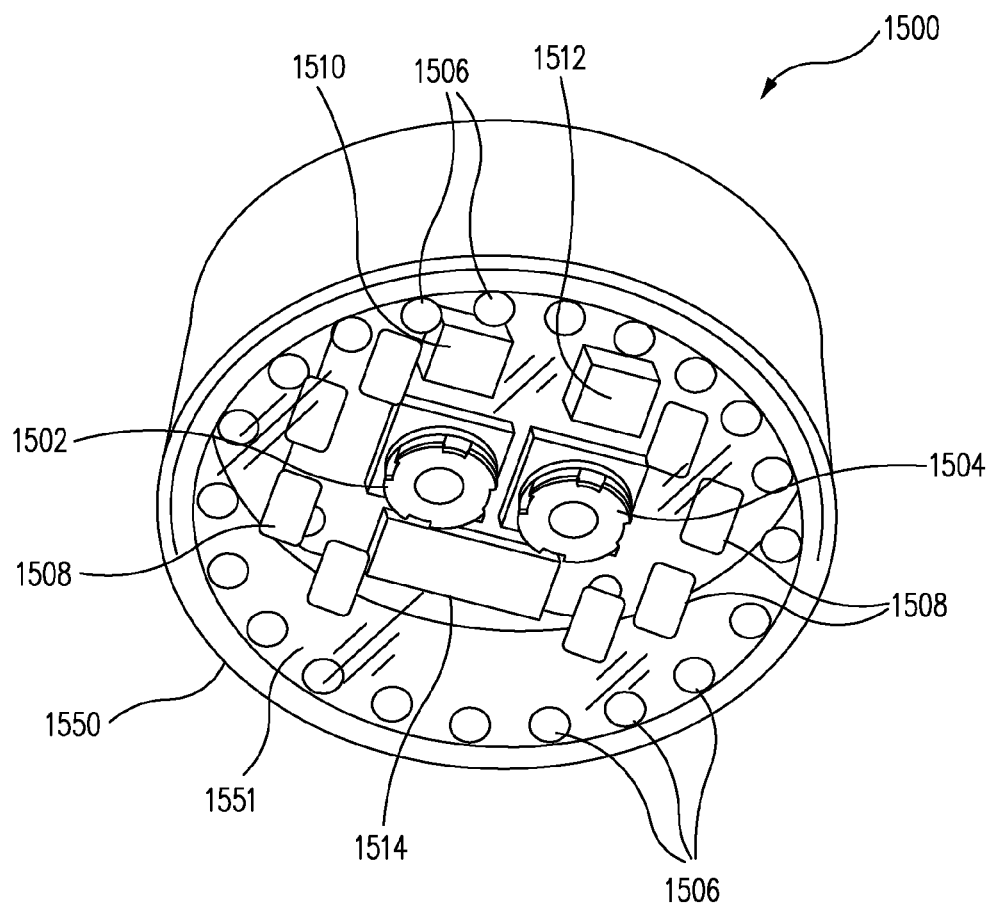
FIG. 15 illustrates a perspective view of a smart surveillance camera system implemented as a module that can be conveniently deployed in accordance with an embodiment of the disclosure.

FIG. 15 shows an example of smart surveillance camera system 1200 implemented as a module 1500 that can be conveniently mounted, attached, or otherwise placed in various locations (e.g., on a ceiling, on a wall) in accordance with yet another embodiment of the disclosure. Module 1500 may include a thermal imager 1502, a visible/NIR light camera 1504, IR illuminators 1506, visible light illuminators 1508, a processor 1510, a communication module 1512, and a storage device 1514, any one of which may be implemented in the same or similar manner as the corresponding components of camera system 1200/1300/1400 except where otherwise noted.

Module 1500 may also include a housing 1550 that permits module 1500 to be mounted, attached, or otherwise installed conveniently at various locations, so that a network of smart surveillance camera systems 1200, for example, may be quickly and conveniently deployed. Module 1500 may also include a transparent cover 1551 disposed on housing 1550. Transparent cover 1551 may be configured to pass infrared and visible light through to infrared imaging module 1502 and visible/NIR light camera 1504, and may protect these and other components of module 1500 from external elements (e.g., rain, debris).

Figure 16:
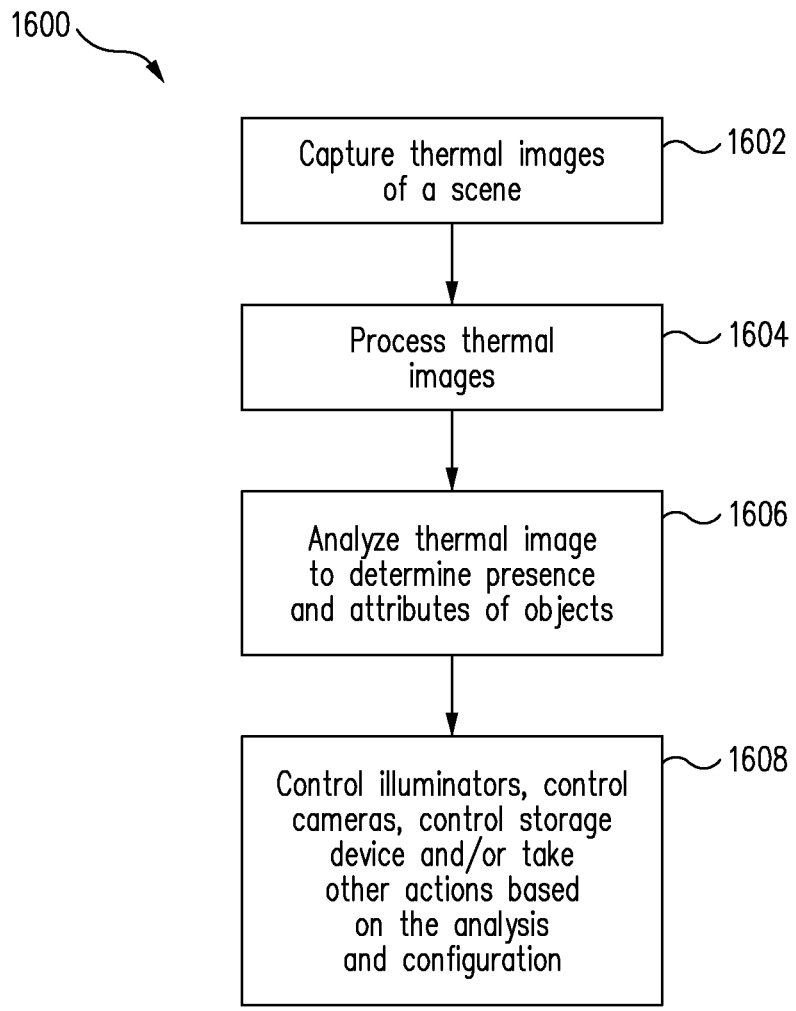
FIG. 16 illustrates a process to perform smart illumination and monitoring of a surveillance scene in accordance with an embodiment of the disclosure.

Referring now to FIG. 16, a flowchart is illustrated of a process 1600 to perform smart illumination and monitoring of a surveillance scene, in accordance with an embodiment of the disclosure. For example, process 1600 may be performed by various embodiments of camera system 1200. It should be appreciated that scene 1230, camera system 1200 and various components thereof are identified only for purposes of example, and that any other suitable camera system may be utilized to perform all or part of process 1600.

At block 1602, thermal images (e.g., containing pixels with radiometric data) of a surveillance scene may be captured by a thermal imager. For example, images of thermal radiation from scene 1230 within FOV 1205 may be captured by thermal imager 1202 of FIG. 12. Because thermal imagers (e.g., thermal imager 1202) passively detect thermal radiation from the scene, active IR illumination is not required. Moreover, in contrast to actively illuminated images that are often washed out if an object is too close to illuminators and too dimly lit if the object is not close enough, thermal images may provide clear thermographic images of objects even in complete darkness and even when obscured by fog or smoke.

The captured thermal images may be radiometrically calibrated thermal images, and in some embodiments scale and/or perspective calibrated thermal images, as described above in connection with thermal imager 1202. The captured thermal images may be received, for example, at processor 1210 that is communicatively coupled to thermal imager 1202.

At block 1604, various thermal image processing operations may be performed on the captured thermal images. For example, one or more NUC processes may be performed on the captured thermal images to remove noise therein, for example, by using various NUC techniques disclosed herein. Various other image processing operations, such as conventional segmentation, filtering, transformation, or deconvolution operations, may also be performed as desired for various applications of process 1600.

At block 1606, the processed thermal images may be further processed and/or analyzed to detect a presence of an object of interest, and determine one or more attributes associated with the detected object. In one embodiment, regions of contiguous pixels having temperature values in a specific range may be detected from the radiometrically calibrated thermal images for detection of an object of interest. For example, the detection operation may differentiate a region (or a "blob") having a surface temperature distribution that is characteristic of a person, a motor vehicle, or an animal. The thermal images and the blob detected therein may be further processed and/or analyzed, for example, by performing various filtering operations and analyzing the size, shape, and/or thermal characteristics of the blob, to ascertain the detection of the object.

In another embodiment, the thermal images may be analyzed to detect one or more candidate foreground objects, for example, using background modeling techniques, edge detection techniques, or other foreground object detection techniques suitable for use with thermal images. The radiometric properties (e.g., surface temperature distribution) of the candidate objects may then be analyzed to determine whether they correspond to those of an object of interest (e.g., a person, a vehicle, an animal). For example, a spider web hanging in front of a thermal imager may initially be detected as a candidate foreground object, but its radiometric properties may then quickly reveal that it does not have a surface temperature distribution characteristic of an object of interest. As this example shows, object detection using the thermal images may be less susceptible to false detection of spurious objects (e.g., close up and/or washed out images of a spider web or a moth) compared with object detection techniques using actively illuminated visible or NIR light images. The size and shape of the candidate objects may also be analyzed, so that the detection may be ascertained based on the size, the shape, and the radiometric properties of the detected candidates.

In one aspect of this embodiment, background modeling techniques may be used to detect objects in the scene. Because the background (e.g., an empty surveillance scene) rarely changes and because thermal images are generally insensitive to changing lighting conditions, a background model (e.g., pixels that belong to a background) may be constructed with high accuracy, and a region of pixels different from the background (also referred to as a "region of interest") may easily be distinguished as a candidate foreground object. As described above, the radiometric properties of such a region of interest (ROI) may then be analyzed to further ascertain whether the detected ROI likely represent an object of interest or not.

Various attributes associated with the detected object of interest may be determined through further analysis and processing and/or during the processing and analysis performed for object detection. For example, the type of the detected object may be determined, by analyzing the size, the shape, and/or the radiometric properties and, in some embodiments comparing them with profiles or signatures of reference objects of a certain type of interest. In various embodiments, the position of the detected object may be determined by translating the pixel coordinates of the detected objects in the thermal images into approximate location in the surveillance scene. In some embodiments, the motion vector (i.e., the speed and direction of movement) associated with the detected objects may also be determined from the thermal images using appropriate techniques in video and image analytics.

In various embodiments, the various processing and analysis operations described for block 1606 may be omitted or included, and may be performed in any other order as appropriate for detecting objects and determining associated attributes. For example, in some embodiments, detecting a warm "blob" in the thermal images may be sufficient to detect an object of interest in a scene, whereas in other embodiments various thermal image analytics may be performed in combination to increase the accuracy of the detection. Other appropriate techniques for detecting objects in thermal images may also be utilized for block 1606.

At block 1608, various illuminators (e.g., IR illuminators 1206/1224 and/or visible light illuminators 1210A-1210B/1226), cameras (visible/NIR light camera 1204/1220), and/or storage devices (e.g., DVRs or other devices) may be activated and/or otherwise controlled based on the presence and the type of an object of interest as determined by analyzing the thermal images of the surveillance scene. For example, as described above with respect to FIG. 12, visible light illuminators may be activated and controlled to illuminate an object in a tracking spotlight mode; visible light illuminators may be activated to illuminate an object in a floodlight mode; IR illuminators may be activated to provide active IR illumination for NIR image recording; visible/NIR light cameras, along with a DVR, may be activated to record images of the surveillance scene; and/or visible/NIR light cameras may be panned, tilted, or zoomed to track an object. Based on the position and/or motion vector of the detected object, cameras and illuminators may be activated, deactivated, or otherwise controlled depending on their locations.

The captured or recorded images of the surveillance scene may include visible/NIR light images, user-viewable thermal images, and/or blended images (e.g., by fusing images captured by a visible/NIR camera with thermal images captured by a thermal imager). In this regard, process 1600 may further include generating user-viewable thermal images of the surveillance scene, and/or combining the thermal images and the visible/NIR light images to generate blended images having a higher definition and/or clarity, as described above in connection with processor 1210 of FIG. 12.

As also discussed above, users may further define, customize, or otherwise configure the association between such operations and the triggering object types. In this regard, user-defined parameters may be received from a user. For example, files or data packets containing the user-defined parameters may be received from an external computer of a user. In another example, commands and/or inputs from a user may be received through a control panel (e.g., including keyboard, pointing device, physical buttons, sliders, dials, or other actuated mechanisms) or graphical user interface (GUI) provided on a camera system. The received files, data, or inputs may be compiled, processed, otherwise managed to update the association between triggering object types and corresponding operations.

In various embodiments, other actions or operations may be performed based on the thermal image analysis. For example, a machine-operated gate or a garage door may be opened or closed based on a detection of a vehicle that is near or approaching the gate or door (e.g., as determined by the position and/or the motion vector). Similarly, a security light, a streetlight, a porch light, or other similar lights and lamps may be controlled based on the type, the position, and/or the motion vector of objects. In another example, alarms may be triggered if an exceptional event occurs (e.g., a person crossing a virtual boundary).

In this regard, process 1600 may further include communicating with external devices. For example, process 1600 may include transmitting control signals to external devices such as an external camera, a building access controller, or a building lighting controller. In other examples, process 1600 may include transmitting captured or recorded images to an external monitoring and/or recorder device, transmitting object detection information or other data generated by various operations of process 1600, and/or receiving commands and configurations (e.g., user-defined parameters) from an external computer.

Therefore, all or part of process 1600 may be performed to intelligently control illumination and monitoring of a surveillance scene, using thermal images of the scene. Appropriate illuminators, cameras, storage devices, and/or other external devices may advantageously be controlled according to the type and/or other attributes of the detected objects, where users may further define or customize corresponding illumination and/or recording operations. Because active illuminators can be turned on intermittently only when needed or desired, accumulation of spider webs or insects may be mitigated and power consumption may be reduced. Moreover, even if spider webs or other spurious objects do build up near camera lenses, thermal image analysis operations in process 1600 permit a more robust detection that can discern spurious objects, thereby preventing recording of meaningless surveillance images.

Where applicable, various embodiments provided by the present disclosure can be implemented using hardware, software, or combinations of hardware and software. Also where applicable, the various hardware components and/or software components set forth herein can be combined into composite components comprising software, hardware, and/ or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a thermal imager comprising a focal plane array (FPA) configured to capture thermal images of a scene;
a light source configured to illuminate the scene;
a camera configured to capture additional images of the scene; and
a processor configured to:
determine a presence of an object in the scene based on the thermal images,
in response to the determined presence of the object, identify the object from among a desired object and a spurious object by analyzing temperature distribution captured in the thermal images to determine geometric characteristics and thermal characteristics of the object, and
selectively operate the light source and the camera in response to identifying the desired object in the scene and according to a predefined association between the identified desired object and corresponding operations to be triggered for the light source and the camera.

2. The system of claim 1, wherein the light source comprises a visible light source and an infrared (IR) light source, wherein the processor is configured to selectively operate either the visible light source or the IR light source in response to the determined presence of the object and the identification of the desired object in the scene and according to the predefined association.

3. The system of claim 1, wherein the processor is further configured to:
analyze the thermal images to determine a position of the desired object in the scene; and
selectively direct the light source toward the desired object in response to a change of the position of the desired object in the scene.

4. The system of claim 1, wherein the processor is further configured to:
analyze the thermal images to determine a size of the desired object in the scene; and
selectively adjust a beam width of the light source based on the size of the desired object in the scene.

5. The system of claim 1, wherein:
the camera is a non-thermal camera configured to captured the additional images of the scene in a visible light (VL) and/or near-infrared (NIR) spectrum; and
the light source is configured to illuminate the scene with light having wavelengths that overlap at least a portion of the VL and/or NIR spectrum associated with the additional images captured by the non-thermal camera in response to control signals from the processor.

6. The system of claim 5, wherein the processor is configured to combine the thermal images and the additional images to generate blended images of the scene.

7. The system of claim 1, wherein:
the desired object comprises a person or a vehicle; and
the predefined association between the identified desired object and the corresponding operations to be triggered for the light source and the camera comprises deactivating the light source and/or the camera as a corresponding operation triggered in response to the identifying that the object is the spurious object.

8. The system of claim 1, wherein the processor is configured to selectively start and stop a recording of the thermal images and/or the additional images in response to the determined presence of the object and the identification of the desired object in the scene and according to the predefined association, the system further comprising a storage device positioned at a remote location relative to the thermal imager and configured to record the thermal images and/or the additional images in response to the processor.

9. The system of claim 1, wherein:
the camera is a first camera having a first field of view (FOV);
the system further comprises a second camera configured to capture other additional images of the scene and having a second FOV; and
the processor is further configured to:
analyze the thermal images to determine a position of the desired object;
determine whether to record the additional images and/or the other additional images based on the position of the desired object relative to the first and second FOVs, and
selectively start and stop a recording of the additional images and/or the other additional images based on the determination of whether to record the additional images and/or the other additional images.

10. The system of claim 1, wherein the processor is further configured to selectively operate an external device in response to the determined presence of the object and the identification of the desired object in the scene and according to the predefined association.

11. The system of claim 1, further comprising a memory communicatively coupled to the processor, wherein the processor is further configured to:
update the predefined association between the identified desired object and corresponding operations to be triggered for the light source and the camera based on a user definition; and
store in the memory the updated predefined association.

12. A method comprising:
capturing, at a focal plane array (FPA) of a thermal imager, thermal images of a scene;
determining a presence of an object in the scene based on the thermal images;
in response to the determined presence of the object, identifying the object from among a desired object and a spurious object by analyzing temperature distribution captured in the thermal images to determine geometric characteristics and thermal characteristics of the object; and selectively operating a light source and a camera in response to identifying the desired object in the scene and according to a predefined association between the identified desired object and corresponding operations to be triggered for the light source and the camera, wherein:

the light source is configured to illuminate the scene, and the camera is configured to capture additional images of the scene.

13. The method of claim 12, wherein the light source comprises a visible light source and an infrared (IR) light source configured to illuminate the scene, the method further comprising selectively operating either the visible light source or the IR light source in response to the determined presence of the object and the identification of the desired object in the scene and according to the predefined association.

14. The method of claim 12, further comprising analyzing the thermal images to determine a position and a size of the desired object in the scene, wherein:

the selectively operating the light source comprises:
selectively directing the light source toward the desired object in response to a change of the position of the desired object in the scene, and
selectively adjusting a beam width of the light source based on the size of the desired object in the scene.

15. The method of claim 12, wherein:
the desired object comprises a person or a vehicle; and
the predefined association between the identified desired object and the corresponding operations to be triggered for the light source and the camera comprises deactivating the light source and/or the camera as a corresponding operation triggered in response to the identifying that the object is the spurious object.

16. The method of claim 12, further comprising combining the thermal images and the additional images to generate blended images of the scene, wherein:

the camera is a non-thermal camera, and
the light source is configured to provide illumination over at least a portion a spectrum associated with the additional images.

17. The method of claim 12, wherein the selectively operating the camera comprises selectively starting and stopping a recording of the thermal images and/or the additional images in response to the determined presence of the object and the identifying of the desired object in the scene and according to the predefined association, wherein the selectively starting and stopping a recording comprises recording the thermal images and/or the additional images to a storage device positioned at a remote location relative to the thermal imager.

18. The method of claim 12, further comprising analyzing the thermal images to determine a position of the desired object, wherein:

the camera is a first camera having a first field of view (FOV); and the selectively operating the camera comprises:
determining whether to record the additional images and/or other additional images of the scene captured by a second camera having a second FOV, based on the position of the desired object relative to the first and second FOVs, and
selectively starting and stopping a recording of the additional images and/or the other additional images based on the determination of whether to record the additional images and/or the other additional images.

19. The method of claim 12, further comprising selectively operating an external device in response to the determined presence of the object and the identification of the desired object in the scene and according to the predefined association.

20. The method of claim 12, further comprising updating the predefined association between the identified desired object and corresponding operations to be triggered for the light source and the camera based on a user definition.

* * * * *